US011198415B2

(12) United States Patent
Herman et al.

(10) Patent No.: US 11,198,415 B2
(45) Date of Patent: Dec. 14, 2021

(54) ON-DEMAND DRIVER SYSTEMS AND METHODS

(71) Applicant: Ford Global Technologies, LLC, Dearborn, MI (US)

(72) Inventors: Dave A. Herman, Southfield, MI (US); David Joseph Orris, Allen Park, MI (US); Nicholas Scheufler, Flat Rock, MI (US); Nunzio Decia, Northville, MI (US); Stephen Jay Orris, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 110 days.

(21) Appl. No.: 16/580,756

(22) Filed: Sep. 24, 2019

(65) Prior Publication Data

US 2020/0017072 A1 Jan. 16, 2020

Related U.S. Application Data

(63) Continuation of application No. 15/198,930, filed on Jun. 30, 2016, now Pat. No. 10,501,054.

(51) Int. Cl.
*G06F 7/00* (2006.01)
*B60R 25/24* (2013.01)
(Continued)

(52) U.S. Cl.
CPC ............ *B60R 25/241* (2013.01); *B60R 25/04* (2013.01); *B60R 25/102* (2013.01);
(Continued)

(58) Field of Classification Search
CPC ..... H04W 4/029; H04W 12/04; H04W 4/023; B60R 25/102; G01C 21/3407;
(Continued)

(56) References Cited

U.S. PATENT DOCUMENTS 9,358,940 B2 * 6/2016 Cooper ................... E05F 15/77
9,533,653 B2 1/2017 Daman et al.
(Continued)

FOREIGN PATENT DOCUMENTS

CN 1914393 2/2007
CN 103178966 6/2013
(Continued)

OTHER PUBLICATIONS

China National Intellectual Property Administration, "First Office Action," issued in connection with Chinese Patent Application No. 2017105053808, dated Nov. 3, 2020, 61 pages.
(Continued)

*Primary Examiner* — Adam M Alharbi
(74) *Attorney, Agent, or Firm* — Brandon Hicks; Hanley, Flight & Zimmerman LLC

(57) ABSTRACT

Example on-demand driver (ODD) systems and methods are described herein. An example method includes generating, with an ODD system, a softkey for a vehicle associated with an agreement between a driver-in-need (DIN) and an ODD, monitoring, with the ODD system, a location of an ODD device carried by the ODD, and transmitting, with the ODD system, the softkey to the ODD device when the ODD device is detected as being within a proximity of the vehicle. In the example method, the softkey is used to unlock the vehicle.

20 Claims, 12 Drawing Sheets

(51) Int. Cl.

| | | |
|---|---|---|
| *G01C 21/34* | (2006.01) | |
| *H04W 4/029* | (2018.01) | |
| *H04L 29/06* | (2006.01) | |
| *G01C 21/36* | (2006.01) | |
| *H04W 4/02* | (2018.01) | |
| *H04W 12/043* | (2021.01) | |
| *B60R 25/04* | (2013.01) | |
| *B60R 25/102* | (2013.01) | |
| *H04L 29/08* | (2006.01) | |
| *H04W 4/40* | (2018.01) | |

(52) U.S. Cl.
CPC ....... *G01C 21/343* (2013.01); *G01C 21/3407* (2013.01); *G01C 21/3423* (2013.01); *G01C 21/3676* (2013.01); *H04L 63/062* (2013.01); *H04L 67/18* (2013.01); *H04W 4/023* (2013.01); *H04W 4/029* (2018.02); *H04W 12/043* (2021.01); *G06Q 2240/00* (2013.01); *H04W 4/40* (2018.02)

(58) Field of Classification Search
CPC .............. G01C 21/3423; G01C 21/343; G01C 21/3676; H04L 63/062; H04L 67/18
See application file for complete search history.

(56) References Cited

U.S. PATENT DOCUMENTS

| | | | |
|---|---|---|---|
| 9,574,887 | B2 | 2/2017 | Ahn et al. |
| 2009/0216600 | A1 | 8/2009 | Hill |
| 2011/0140926 | A1* | 6/2011 | Schrabler ........... G07C 9/00182 |
| | | | 340/989 |
| 2014/0129053 | A1 | 5/2014 | Kleve et al. |
| 2014/0227980 | A1 | 8/2014 | Esselink et al. |
| 2015/0039365 | A1 | 2/2015 | Haque |
| 2015/0148989 | A1 | 5/2015 | Cooper et al. |
| 2016/0055699 | A1 | 2/2016 | Vincenti |
| 2016/0096508 | A1* | 4/2016 | Oz ........................ H04L 63/08 |
| | | | 701/36 |
| 2016/0098871 | A1 | 4/2016 | Oz et al. |
| 2016/0098876 | A1* | 4/2016 | Oz ........................ H04W 4/023 |
| | | | 340/5.61 |
| 2016/0099927 | A1* | 4/2016 | Oz ........................ G07C 5/0808 |
| | | | 726/9 |
| 2018/0001870 | A1 | 1/2018 | Herman et al. |
| 2019/0047513 | A1* | 2/2019 | Fuke .................. G06Q 10/083 |
| 2020/0310407 | A1* | 10/2020 | Van Wiemeersch ................ |
| | | | B60R 25/241 |

FOREIGN PATENT DOCUMENTS

| | | |
|---|---|---|
| CN | 104627091 | 5/2015 |
| CN | 104919281 | 9/2015 |
| DE | 102013016097 | 4/2015 |
| EP | 2178271 | 4/2010 |
| EP | 3063043 | 9/2016 |
| KR | 20100015021 | 2/2010 |
| KR | 100993636 | 11/2010 |
| KR | 201200///81 | 7/2012 |

OTHER PUBLICATIONS

South China Morning Post, "Didi Chauffeur and test-drive services are GO: Chinese car-hailing app seeing 500,000 'designated driver' rides a day," Nov. 10, 2015, 2 pages.

Intellectual Property Office of the United Kingdom, "Search Report under Section 17(5)," issued in connection with Patent Application No. GB1710267.4, dated Dec. 14, 2017, 7 pages.

United States Patent and Trademark Office, "Restriction", issued in connection with U.S. Appl. No. 15/198,930, dated Jan. 8, 2018, 6 pages.

United States Patent and Trademark Office, "Non-Final Office Action", issued in connection with U.S. Appl. No. 15/198,930, dated May 17, 2018, 19 pages.

United States Patent and Trademark Office, "Final Office Action", issued in connection with U.S. Appl. No. 15/198,930, dated Oct. 2, 2018, 11 pages.

United States Patent and Trademark Office, "Notice of Allowance and Fee(s) Due", issued in connection with U.S. Appl. No. 15/198,930, dated Jun. 19, 2019, 14 pages.

\* cited by examiner

ON-DEMAND DRIVER SYSTEMS AND METHODS

RELATED APPLICATION

This patent arises from a continuation of U.S. application Ser. No. 15/198,930, titled "On-Demand Diver Systems and Methods," filed Jun. 30, 2016, which is hereby incorporated by reference in its entirety.

FIELD OF THE DISCLOSURE

This disclosure relates generally to drivers and, more particularly, to on-demand driver systems and methods.

BACKGROUND

There are many situations in which an individual is unable to drive his/her vehicle, such as after a hospital stay, when the individual is in an inebriated state or where a medical condition prohibits the individual from driving. In other situations, an individual may desire their vehicle to be driven from one location to another location. Thus, individuals often desire to have a driver drive his/her vehicle, with or without the individual in the vehicle, from one location to another.

SUMMARY

Example on-demand driver systems and methods are disclosed herein. An example method disclosed herein includes generating, with an on-demand driver (ODD) system, a softkey for a vehicle associated with an agreement between a driver-in-need (DIN) and an ODD, monitoring, with the ODD system, a location of an ODD device carried by the ODD, and transmitting, with the ODD system, the softkey to the ODD device when the ODD device is detected as being within a proximity of the vehicle. In the example method, the softkey is used to unlock the vehicle.

Another example method disclosed herein includes generating, with an on-demand driver (ODD) system, a first softkey and a second softkey for a vehicle associated with an agreement between a driver-in-need (DIN) and an ODD, and transmitting, with the ODD system, the first softkey to an ODD device carried by the ODD and the second softkey to a DIN device carried by the DIN. In the example method, the first softkey and the second softkey are required to unlock the vehicle.

An example apparatus disclosed herein includes an agreement database to store an on-demand driver (ODD) agreement between a driver-in-need (DIN) and an ODD for transportation of a vehicle and a location monitor to track a location of an ODD device carried by the ODD. The example apparatus also includes a softkey manager to generate a softkey for starting the vehicle and transmit the softkey to the ODD device when the ODD device is detected as being within a proximity of the vehicle.

Figure 1:
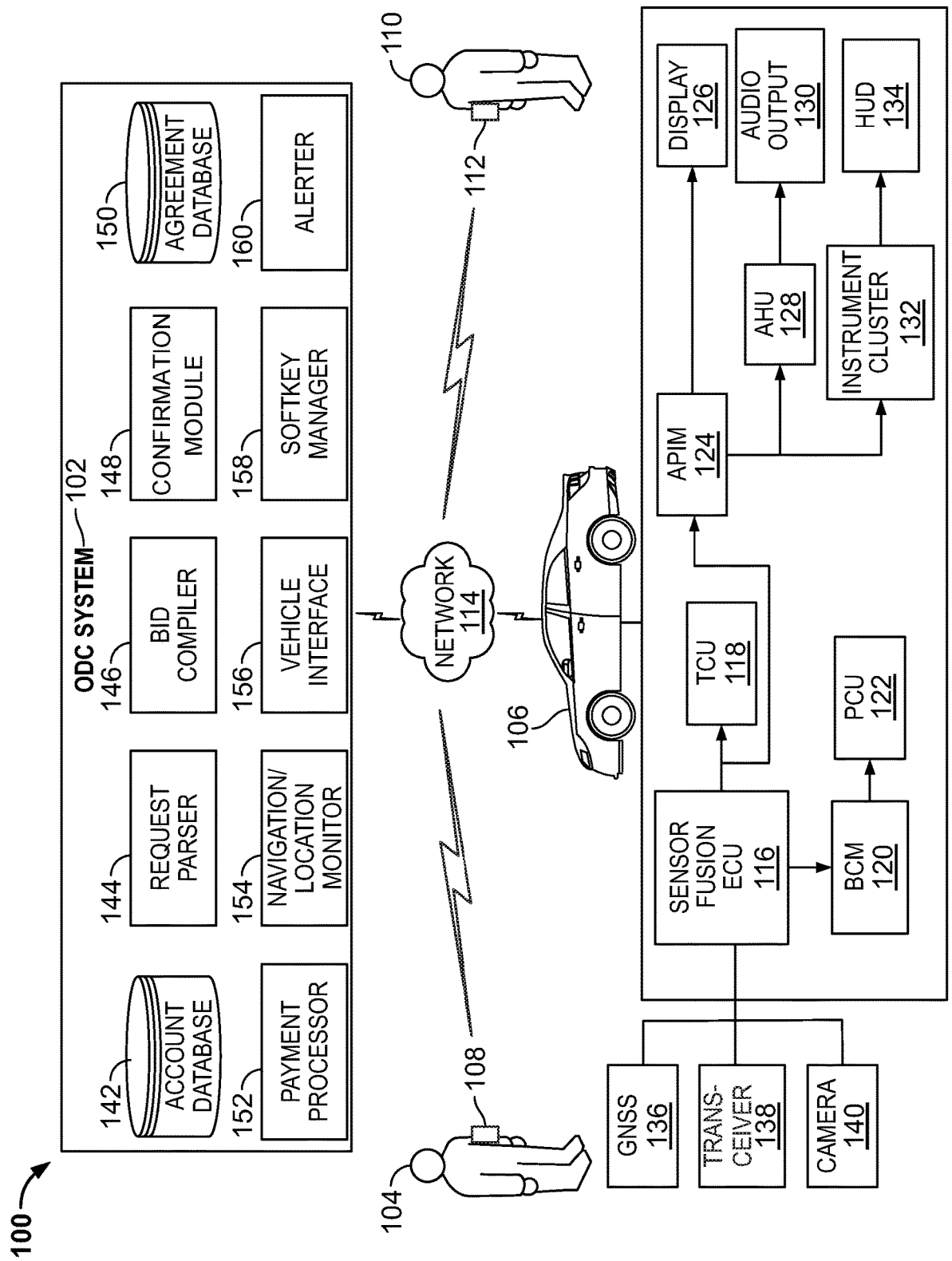
FIG. 1 illustrates an example on-demand chauffeur (ODC) system in which the teachings of this disclosure may be implemented.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

Example methods, systems/apparatus and articles of manufacture are disclosed herein for facilitating an on-demand driver (ODD) service between a driver-in-need (DIN) and an ODD. As used herein, a driver-in-need (DIN) means any person who desires to employ a driver (e.g., a chauffeur) to transport a vehicle from one location to another. The DIN may or may not be the owner of the vehicle. As used herein, the terms driver, on-demand driver (ODD), chauffeur and on-demand chauffeur (ODC) may be used interchangeably and mean any person willing to drive a vehicle from one location to another, with our without the DIN. As used herein, an ODC service means a transfer of a vehicle between two locations, with or without the DIN.

There are many instances in which a DIN may desire to have his/her vehicle transported from one location to another. For example, the DIN may be incapacitated or unable to drive the vehicle such as, for example, after a hospital stay or when the DIN is in an inebriated or incapacitated state (e.g., drunk). In such instances, the DIN may desire to hire a driver to drive the vehicle for the DIN. In other examples, the DIN may be capable of driving of the vehicle but may still desire a driver to transport the vehicle from one location to another. For example, a DIN may be going on a canoe trip, and may desire someone to drive the vehicle from one location, up-stream, to another location, down-stream, where the DIN can meet back up with the vehicle. In other words, there are numerous situations in which an individual may desire or need his/her vehicle (or another person's vehicle) to be driven from one location to another.

Example ODC systems are disclosed herein that facilitate an agreement between a DIN and an ODC and the execution of an ODC service. In the disclosed examples, a DIN communicates with the ODC system via a DIN device, such as a mobile phone, and creates a request for an ODC service. The request includes request criteria, such as the vehicle pick-up location, the vehicle drop-off location, time constraints, etc. Other criteria may include, for example, an ODC gender preference, an ODC minimum review rating, a flexible time scheduling mode, a reserve maximum price limit and/or a geo-fence proximity to the vehicle. The ODC system receives the request (e.g., via an Internet connection), searches for potential ODCs and transmits the request to the ODCs that meet the request criteria. The ODCs communicate with the ODC system via an ODC device, which may also be a mobile phone. The ODCs view the request and, if willing, enter a bid for completing the requested vehicle transfer. The ODC system then compiles the one or more bids from the ODCs and transmits them to the DIN device. The DIN may select one of the bids to complete the ODC service agreement. In some examples, after a DIN has selected a bid from an ODC, the ODC system sends a final confirmation request to the ODC to verify the ODC is still willing and/or able to perform the ODC service. If confirmed, an agreement is reached.

To enable the ODC to access the vehicle and start the vehicle (e.g., when the DIN is not present), example ODC systems generate a softkey (e.g., a digital key) that corresponds to the vehicle and sends the softkey to the ODC device. When the ODC is within a proximity of the vehicle, the ODC can transmit (e.g., via Bluetooth®, Wi-Fi, cellular data, etc.) the softkey from the ODC device to the vehicle, which unlocks the doors of the vehicle. In some examples, the softkey also enables the ODC to start the vehicle. As a result, the example ODC systems enable an ODC to unlock the vehicle and drive the vehicle without access to the physical key to the vehicle. In some examples, as a safety feature, the softkey includes a proximity limitation. The softkey is not transferred to the ODC device until the ODC is detected as being within a set proximity of the vehicle. Additionally or alternatively, the softkey may include a time limitation. If the ODC does not reach the vehicle within a set time, the softkey expires and is not sent to the ODC device.

In some examples, when the DIN is to accompany the vehicle during the ODC service, a dual softkey may be required. In particular, a first softkey is generated for the ODC device and a second softkey is generated for the DIN device. Both softkeys are required to unlock the vehicle and/or start the vehicle. The use of a dual softkey enables the DIN to back out of the ODC service after meeting the ODC at the vehicle. For example, if the ODC appears to be unfit to drive, the DIN can decline to activate the second softkey, thereby preventing the ODC from accessing the vehicle.

Example ODC systems disclosed herein monitor or track the location of the vehicle during the transportation. In some examples, the ODC system determines a navigation route and provides the navigation route to the ODC device and/or the vehicle so that the ODC can be guided to the vehicle drop-off location. In some examples, if the vehicle is detected as departing from the route or a corridor of the route (e.g., a predefined distance or radius from the route), the ODC system transmits an alert to the vehicle. The alert may be displayed on an instrument cluster of the vehicle, for example. The alert notifies the ODC that he/she has diverted from the instructed route and should proceed back to the route. In some examples, an option is provided to contact the DIN in order to gain authorization for deviating from the route. If the ODC does not return to the instructed route within a period of time, an alert or notification is transmitted to the DIN device that alerts the DIN the vehicle has departed from the instructed route. In some examples, the alert enables the DIN to contact the ODC (e.g., to determine the reason or diverting from the instructed route). If the DIN approves, the DIN can authorize the ODC to continue with the diverted route. Otherwise, the alert enables the DIN to contact the authorities and/or disable the vehicle.

Turning in detail to the figures, FIG. 1 illustrates an example system 100 that employs an on-demand chauffeur (ODC) system 102 to facilitate scheduling and execution of an ODC service. In the illustrated example, a driver-in-need (DIN) 104 desires his/her vehicle 106 to be transported, with or without the DIN 104, from one location (a vehicle pick-up location) to another location (a destination location or vehicle drop-off location). The ODC system 102 may be implemented using a server operating one or more applications or programs. The DIN 104 communicates with the ODC system 102 using a DIN device 108. In the illustrated example, the DIN device 108 is a mobile smart phone. However, the DIN device 108 may be any electronic device, such as a computer (e.g., a desktop computer, a portable computer or laptop), a hand-held device (e.g., a smartphone, a tablet, etc.), a wearable device (e.g., a smart-watch), an infotainment system in the vehicle 106 and/or any other electronic device having a display and a processor. In some examples, the DIN device 108 includes a Global Navigation Satellite System (GNSS) (e.g., a Global Position System (GPS) sensor) to track a location of the DIN device 108 and/or a wireless transceiver (e.g., a Bluetooth® transceiver), as discussed in further detail herein.

The example ODC system 102 searches for one or more persons, registered as ODCs, that are willing and able to perform the ODC service and facilitates an ODC service as requested by the DIN 104. An example ODC 110 is illustrated in FIG. 1. The ODC 110 communicates with the ODC system 102 via an ODC device 112. Similar to the DIN device 108, the ODC device 112 is implemented as a mobile phone, but may be any electronic device, such as a computer (e.g., a desktop computer, a portable computer or laptop), a hand-held device (e.g., a smartphone, a tablet, etc.), a wearable device (e.g., a smart-watch), and/or any other electronic device having a display and a processor. In some examples, the ODC device 112 includes a GNSS to track a location of the ODC device 112 and/or a wireless transceiver (e.g., a Bluetooth® transceiver). While only one ODC 110 is depicted, it is understood that any number of ODCs may be connected and/or in communication with the ODC system 102.

In the illustrated example of FIG. 1, the vehicle 106, the DIN device 108 and the ODC device 112 communicate with the ODC system 102 via a network 114. The example network 114 of the illustrated example of FIG. 1 is the Internet. However, the example network 114 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 114 enables the ODC system 102 to be in communication with the vehicle 106, the DIN device 108 and the ODC device 112. As used herein, the phrase "in communication," including variants thereof, encompasses direct communication and/or indirect communication through one or more intermediary components and does not require direct physical (e.g., wired) communication and/or constant communication, but rather includes selective communication at periodic or aperiodic intervals, as well as one-time events.

In the illustrated example, a number of software, firmware and/or hardware components of the vehicle 106 are illustrated. In other examples, the vehicle 106 may implement more or fewer of the example components. In the illustrated example, the vehicle 106 includes a sensor fusion engine control unit (ECU) 116, a telecommunications control unit (TCU) 118, a body control module (BCM) 120, a power train control unit (PCU) 122, an accessory protocol interface module (APIM) 124, a display or human machine interface (HMI) 126, an audio head unit (AHU) 128, an audio output 130, an instrument cluster 132 and a heads-up display (HUD) 134.

The sensor fusion ECU 116 interfaces with one or more devices or sensors and fuses the information from the device(s) or sensor(s) to maintain an awareness of the space the vehicle 106 is occupying and the surroundings of the vehicle 106. In the illustrated example, the vehicle includes a GNSS 136, a wireless transceiver 138 and a camera 140. The GNSS 136 may include, for example, a GPS sensor, and is used for tracking the location of the vehicle 106. The GNSS 136 may be based on any constellation of satellites used for geolocation, such as GPS, Glonass, Gallileo, Baidou, etc. The wireless transceiver 138 may include, for example, a Bluetooth® transceiver or any other near field communication (NFC) device, and is used to establish wireless communication with other devices, such as the DIN device 108 and/or the ODC device 112. Additionally or alternatively, the wireless transceiver 138 may be used detect, identify and/or track other devices, such the DIN device 108 and/or the ODC device 112. The camera 140 is used to track and/or identify people as they approach the vehicle 106. In other examples, the vehicle 106 may include more or fewer sensors or devices. The sensor fusion ECU 116 processes the signals from the devices 136, 138, 140 and communicates with the other components of the vehicle 106.

In the illustrated example, the TCU 118 provides connection to a cellular network to transfer data between the vehicle 106 and the network 114. In some examples, the TCU 118 communicates with the network 114 through a protected network (e.g., a private network) operated by the manufacturer of the vehicle 106 (or another entity) to guarantee the privacy and capacity of the various telematic functions. The BCM 120 is an ECU that authenticates one or more key(s) (e.g., a softkey or digital key) that allow locking/unlocking and/or starting of the vehicle 106, as disclosed in further detail herein. The PCU 122 (e.g., a powertrain control module) is an ECU that controls the engine (e.g., starting and stopping of the engine).

The APIM 124 manages the state of an infotainment system in the vehicle 106. The APIM 124 is responsible for generating the HMI or graphical user interface (GUI) content and maintaining the business logic of the vehicle 106. In some examples, the APIM 124 includes Wi-Fi and/or Bluetooth® connectivity. The display 126 is a terminal (e.g., a screen, an HMI, a GUI, etc.) for displaying the HMI/GUI content generated by the APIM 124. The display 126 may include touch response input, audio, etc.

The AHU 128 is an ECU that receives AM/FM signals and/or other audio signals and routes the signals to the audio output 130. The audio output 130 is a vehicle speaker system and includes one or more speakers. In some examples, the audio signals are first routed through an amplifier. The instrument cluster 132 displays the Federal Motor Vehicle Safety Standards (FMVSS) mandated information (e.g., speedometer, odometer, fuel gauge, etc.). The instrument cluster 132 also generates the HMI/GUI content for the HUD 134, which is a projected image that is displayed on a windshield or dash of the vehicle 106. In the illustrated example, the components of the vehicle 106 may be communicatively coupled by any wired or wireless network, such as Controller Area Network bus (CAN bus), an Ethernet link or a low-voltage differential signaling (LVDS) link.

In some examples, prior to negotiating an ODC service, both the DIN 104 and the ODC 110 establish a service account with the ODC system 102 to facilitate the necessary communication between the DIN device 108, the ODC device 112 and the vehicle 106. In the illustrated example, the ODC system 102 includes an account database 142 that includes accounts for persons registered as potential DINs and/or ODCs. For an ODC, the account creation process may include verification of a valid driver's license (e.g., that complies with the particular states guidelines) and/or other age restrictions per local city ordinance (e.g., curfews). In some examples, other information may be required for an ODC account such as verification of valid insurance, a background check on the number of traffic violations, etc. A DIN account may include information regarding the DIN's vehicle, the location of the vehicle, verification of a valid state license plate registration, etc. Further, in some examples, the accounts for the DINs and ODCs may include pictures of the individuals, review ratings for the individuals, and/or other bibliographic and/or identifying information. The accounts of the certified ODCs and the DINs are saved in the account database 142.

Figure 2:
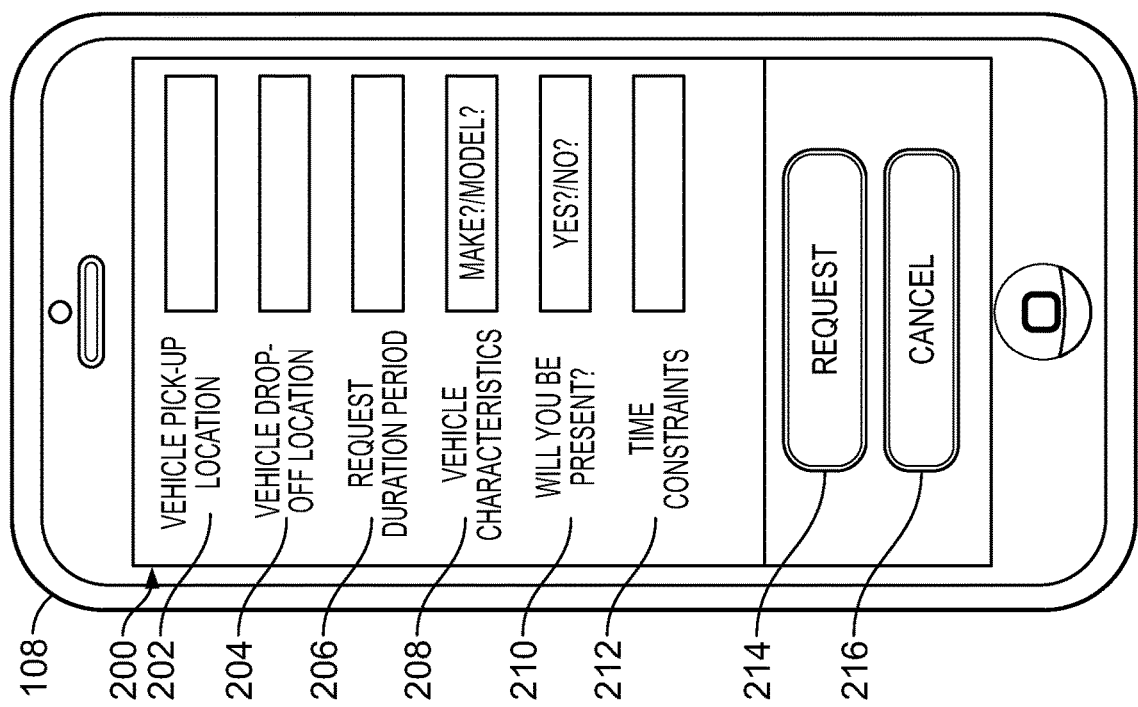
FIG. 2 illustrates an example interface displayed on an example driver-in-need (DIN) device for creating a request for an ODC service with the example ODC system of FIG. 1.

When the DIN 104 desires to schedule an ODC service, the DIN 104 creates a request (e.g., an ODC request) via the DIN device 108. The DIN device 108 includes a screen with an interface for communicating with the ODC system 102. The interface may be an application (e.g., an ODC application) stored on the DIN device 108 (and serviced by the ODC system 102). In other examples, the interface may be provided via an internet browser on the DIN device 108. FIG. 2 illustrates an example interface 200 displayed on the DIN device 108 for creating a request for an ODC service (e.g., an ODC request). The request includes criteria or parameters for defining the desired ODC service. In the illustrated example, the interface 200 includes a vehicle pick-up location input 202. In some examples, the DIN 104 may manually specify the desired vehicle pick-up location (e.g., if the pick-up location is not the current location of the vehicle 106). Additionally or alternatively, if the vehicle pick-up location is the current location of the vehicle 106, the current location may be detected via the GNSS 136 (FIG. 1) and input into the vehicle pick-up location input 202. The interface 200 also includes a vehicle drop-off location input 204, where the DIN 104 specifies the desired vehicle drop-off location (e.g., the DIN's home, an office, etc.). In the illustrated example, the interface 200 includes a request duration input 206 for entering a request duration period. The request duration period is a time period in which the request must be confirmed and/or performed, otherwise the request expires.

In the illustrated example, the interface 200 includes a vehicle characteristics input 208. The DIN 104 may input identifiable characteristics of the vehicle 106 such as the make of the vehicle 106, the model of the vehicle 106, the color of the vehicle 106, the license plate number, etc., which may help the ODC 110 identify the vehicle 106. The interface 200 includes a DIN presence identifier 210. The DIN 104 specifies whether the DIN 104 is going to be present with the vehicle 106. As mentioned above, in some situations the DIN 104 may desire to be driven in the vehicle 106, whereas in other situations the DIN 104 may desire the vehicle 106 to be transferred without the presence of the DIN 104. In the illustrated example, the interface 200 includes a time constraints input 212, which enables the DIN 104 to define time constraints, such as the time period in which the DIN 104 desires the ODC service. In some examples, the DIN 104 defines a specific time window around the requested ODC service. For example, the DIN 104 may specify that the ride is to occur within the next 20 minutes. In other examples, the DIN 104 defines a time window around the requested time (e.g., plus or minus 10 minutes). In some examples, a preset time window (e.g., a default time window) may be employed.

In some examples, other request criteria may be specified via the interface 200 and provided with the request. For example, the DIN 104 may specify an ODC gender preference (e.g., a woman DIN may feel more comfortable with a woman ODC than a male ODC), an ODC minimum review rating, a flexible time scheduling mode, a reserve maximum price limit and/or a geo-fence proximity to the vehicle 106.

Once the desired request criteria are specified, the DIN 104 selects a request button 214 to submit the request. The request, along with the request criteria, is sent from the DIN device 108 to the ODC system 102. Otherwise the DIN 104 may select a cancel button 216 to cancel the request.

Referring again to FIG. 1, the ODC system 102 includes a request parser 144. The request parser 144 analyzes the request criteria, determines which ODCs meet or satisfy the request criteria (e.g., based on availability, gender, review rating, etc.), and transmits the request to the qualified ODCs. In some examples, the request is only sent to ODCs within a defined geocoded region (e.g., within a proximity of the vehicle 106).

Figure 3:
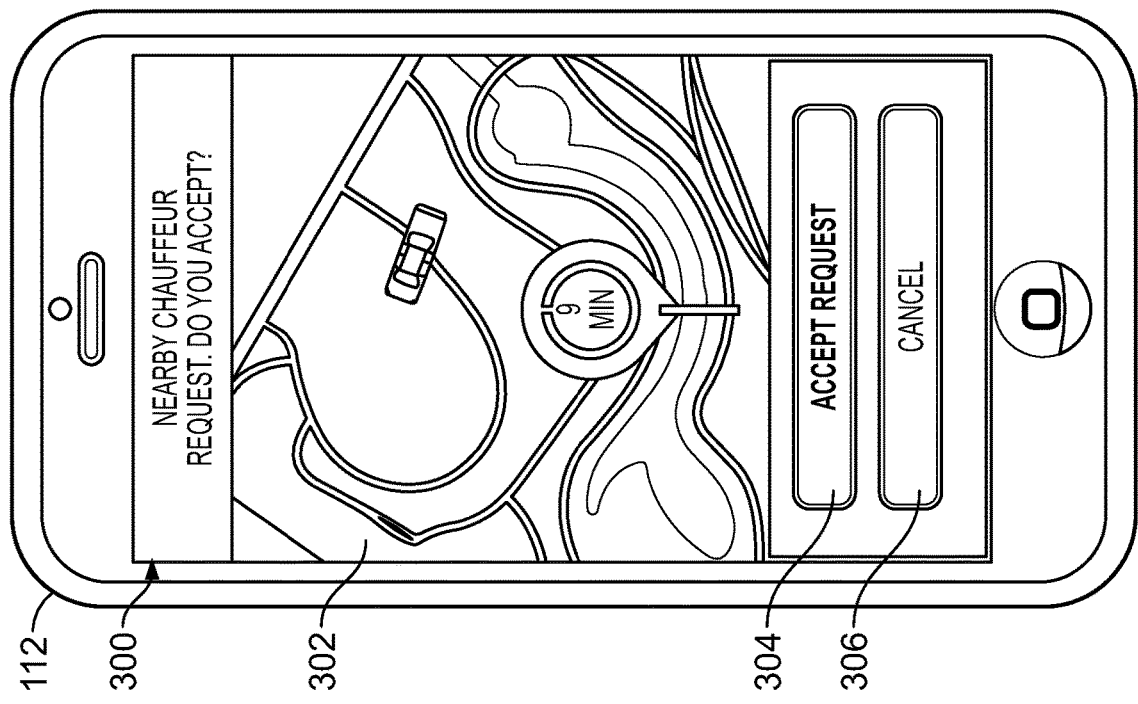
FIG. 3 illustrates an example interface displayed on an example ODC device for viewing a request for an ODC service from the example ODC system of FIG. 1.

Once the request is distributed, the request may be viewed on the ODC device 112. Similar to the DIN device 108, the ODC device 112 includes a screen for displaying an interface for communicating with the ODC system 102. The interface may be an application (e.g., an ODC application) stored on the ODC device 112 (and serviced by the ODC system 102). In other examples, the interface may be provided via an internet browser on the ODC device 112. FIG. 3 illustrates an example interface 300 displayed on the ODC device 112 for viewing a request for an ODC service. In the illustrated example, the request is displayed on a map 302 showing the location of the vehicle 106 (e.g., the vehicle pick-up location), the vehicle drop-off location and an estimated time for driving the vehicle 106 to the vehicle drop-off location. In other examples, the map 302 may include more or less information. If the ODC 110 wants to proceed with the requested ODC service, the ODC 110 can select an accept button 304 (e.g., "Accept Request") to place a bid for the request. Otherwise, if the ODC 110 does not want to proceed with the requested ODC service, the ODC 110 can select a cancel button 306.

In some examples, multiple requests may be pending at the same time. In such an example, the interface 300 displays multiple requests within a defined radius of the ODC 110 (e.g., 1 mile from the current location of the ODC 110). In other examples, the request(s) may be displayed in a list (e.g., an "auction-style" listing format), which may include information such as, for example, the distance to the vehicle, the rating of the DIN, any time constraints, etc. The ODC 110 may browse the available request(s), select a request and select the accept button 304 to place a bid for the selected request. In some examples, a pop-up notification is displayed on the ODC device 112 alerting the ODC 110 of a potential job nearby. The ODC 110 may select to view the request, which is presented via the interface 300, for example.

Figure 4:
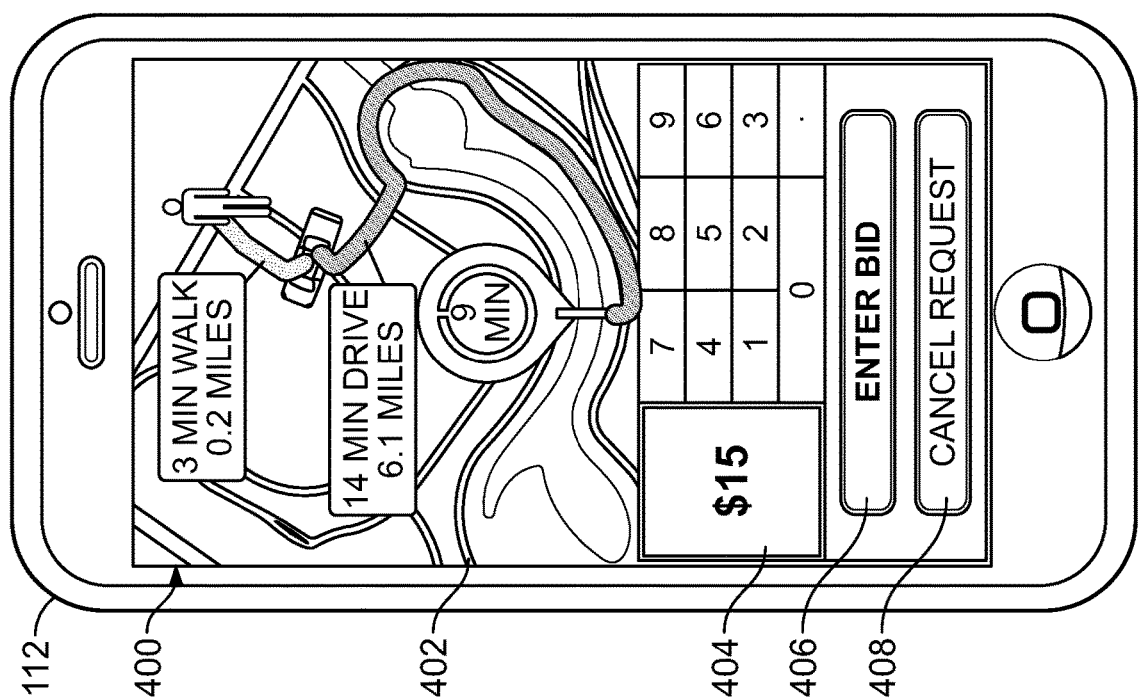
FIG. 4 illustrates an example interface displayed on an example ODC device for entering a bid price for performing an ODC service from the example ODC system of FIG. 1.

FIG. 4 illustrates an example interface 400 displayed on the ODC device 112 for entering a bid associated with the request. In the illustrated example, the interface 400 includes a map 402 (e.g., similar to the map 302). In the illustrated example, the map 402 shows the location of the ODC 110, the vehicle pick-up location, an estimated time and distance to the vehicle pick-up location, the vehicle drop-off location and an estimated time and distance between the vehicle pick-up location and the vehicle drop-off location. In other examples, the map 402 may include more or less information. In the illustrated example, the interface 400 includes a number pad 404 in which the ODC 110 may enter a desired price or fee for completing the ODC service. After the bid is entered, the ODC 110 selects an enter bid button 406 to complete the bid and send the bid to the ODC system 102. Otherwise, the ODC 110 can select a cancel request button 408 to cancel the request.

Figure 5A:
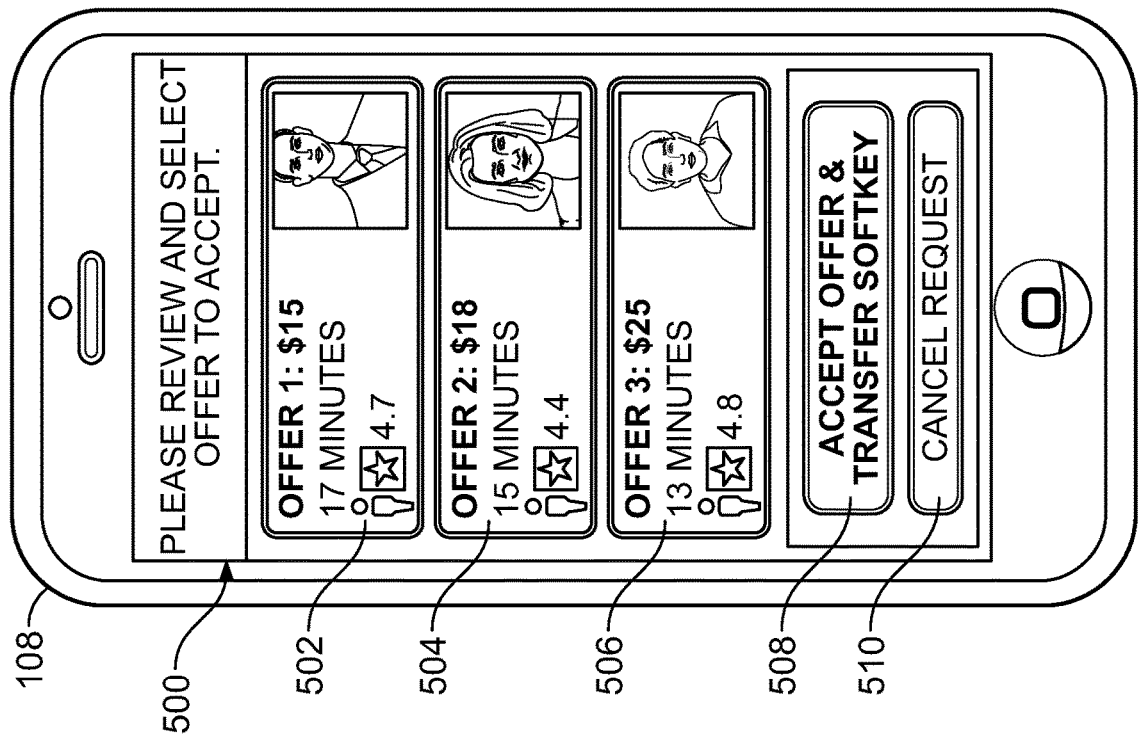
FIG. 5A illustrates an example interface displayed on an example DIN device for reviewing and accepting a bid to perform an ODC service via the example ODC system of FIG.

Referring back to FIG. 1, the ODC system 102 includes a bid compiler 146 that compiles the one or more bids from the ODCs and transmits the bid(s) to the DIN 104 for viewing by the DIN 104 on the DIN device 108 (e.g., on a phone, in the vehicle 106, etc.). FIG. 5A illustrates an example interface 500 displayed on the DIN device 108 for viewing the bid(s). The interface 500 includes a listing of the bid(s) provided by the ODC(s). In the illustrated example, the interface 500 includes a first bid 502, a second bid 504 and a third bid 506. In other examples, more or fewer bids may be active. The first bid 502 may be associated with the ODC 110, for example. In the illustrated example, the bids include the ODCs' respective review ratings, the ODCs' respective distances to the vehicle 106, the quoted prices (i.e., the bid price) and/or pictures of the respective ODCs. In other examples, more or less information about the ODCs may be displayed. The DIN 104 may review the bids, select one of the bids, and then select an accept button 508 (e.g., "Accept Offer & Transfer Softkey"). Otherwise, the DIN 104 may select a cancel request button 510 to cancel the ODC request. The selected bid information is sent from the DIN device 108 to the ODC system 102.

Figure 5D:
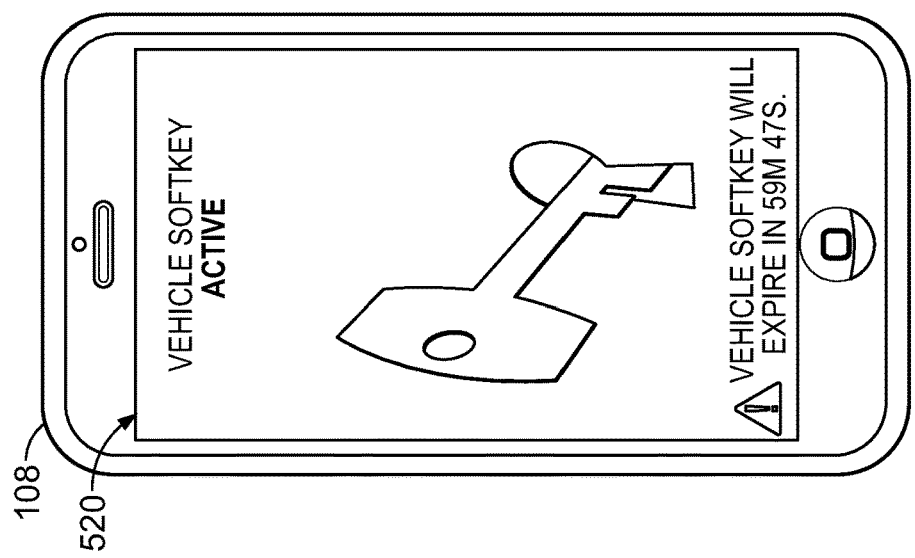
FIGS. 5B, 5C and 5D illustrate example interfaces displayed on an example DIN device for authorizing the creation of a softkey via the example ODC system of FIG. 1.
Figure 5C:
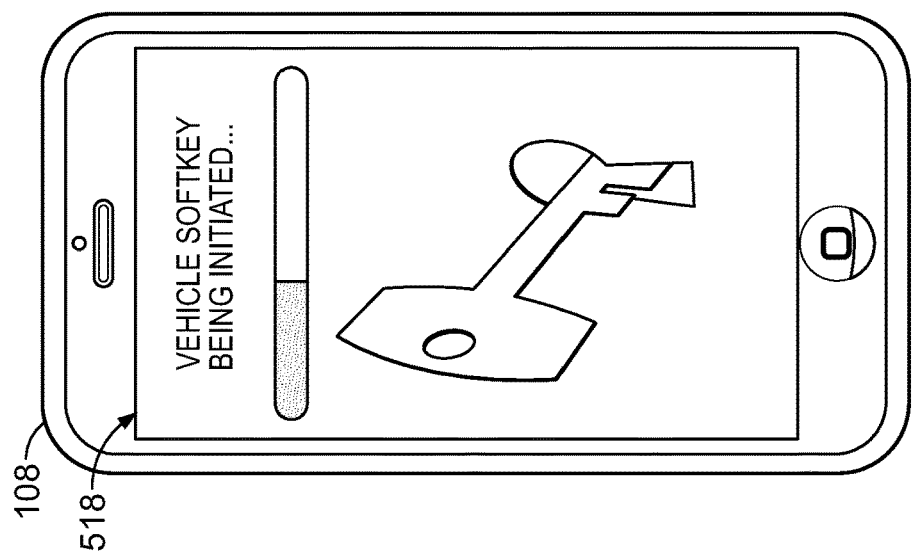
Figure 5B:
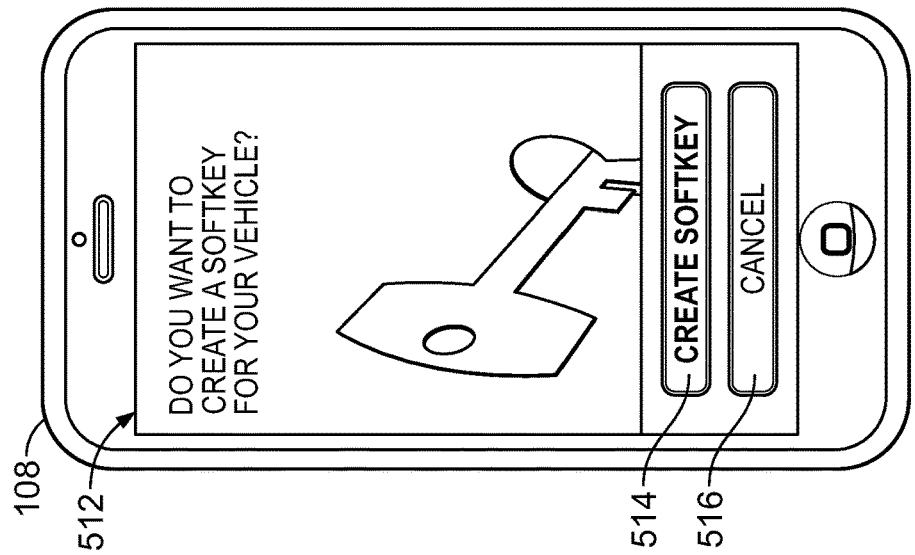

In some examples, after an agreement between the DIN 104 and the ODC 110 is reached, the DIN device 108 is used to authorize the creation of a softkey for the vehicle 106. FIGS. 5B-5D illustrate example interfaces displayed on the DIN device 108 for authorizing the creation of a softkey and are desired in further detail below.

In some examples, once the DIN 104 has accepted the bid, a final verification is transmitted to the ODC device 112 to confirm the ODC service. Referring back to FIG. 1, the ODC system 102 includes a confirmation module 148. The confirmation module 148 receives the selected bid from the DIN device 108 and transmits a confirmation notice to ODC device 112. In some examples, requiring the ODC 110 to provide a final confirmation enables the ODC 110 to make the final decision whether or not to proceed with the requested ODC service. In some examples, too much time may have passed since the ODC 110 entered the bid and the ODC 110 may not be willing or to perform the requested ODC service anymore.

Figure 6:
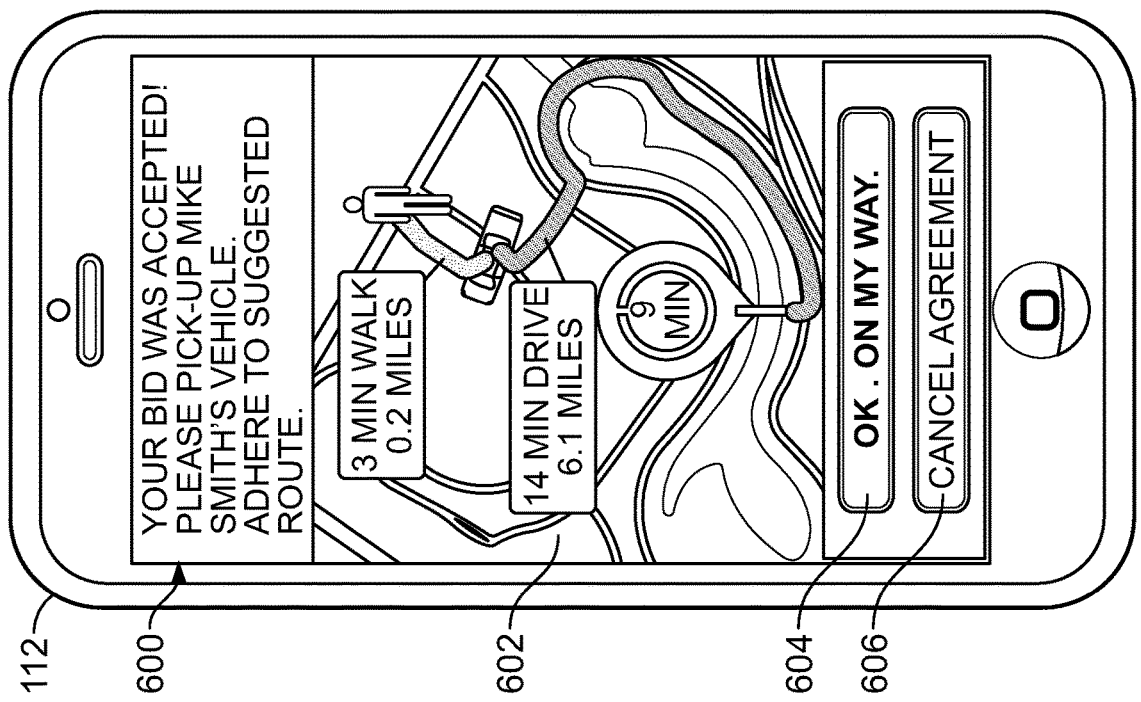
FIG. 6 illustrates an example interface displayed on an example ODC device for confirming an ODC service from the example ODC system of FIG. 1.

FIG. 6 illustrates an example interface 600 displayed on the ODC device 112 for confirming the ODC service. In the illustrated example, the interface 600 includes a map 602. Similar to the map 402 of FIG. 4, the map 602 shows the current location of the ODC 110, the vehicle pick-up location, a suggested route for traveling to the vehicle pick-up location, an estimated distance and time between the ODC 110 and the vehicle pick-up location, the vehicle drop-off location, a suggested route for driving the vehicle 106, and an estimated distance and time between the vehicle pick-up location and the vehicle drop-off location. In other examples, the map 602 may include more or less information. If the ODC 110 desires to continue with the ODC service, the ODC 110 selects an accept button 604 (e.g., "OK. On my way."). Otherwise, if the ODC 110 does not want to continue with the ODC service, the ODC 110 may select a cancel button 606 to cancel the agreement. In some examples, after the ODC 110 accepts the request, the confirmation module 148 transmits a notice to the DIN device 108 to indicate the ODC service is being performed by the ODC 110.

In some examples, the request includes an expiration time period that may be set by the DIN 104 when placing the request (e.g., via the request duration input 206). If the request is not confirmed by both parties prior the expiration, the request may expire. Otherwise, the DIN 104 may select to extend the request or re-list the request at a later time (e.g., with different criteria, such as with a higher reserve price, more flexible time constraints, etc.).

Once an agreement is reached, the agreement (along with the associated information (e.g., the request criteria)) is saved in an agreement database 150 (FIG. 1). In some examples, once an agreement is reached, payment for the ODC service is processed (e.g., via a pre-authorized payment method stored in the account of the DIN 104 and the ODC 110). The example ODC system 102 includes a payment processor 152 that processes payment from the DIN 104 to the ODC 110. In some examples, the ODC 110 specifies his/her payment requirements (e.g., when entering the bid). In some examples, the account of the DIN 104 may be pre-funded, and the funds may be automatically transferred from the account of the DIN 104 to the account of the ODC 110. In other examples, payment may be transferred after completion of the ODC service.

In some examples, a pre-authorization mode is provided to enable the DIN 104 to create a request and delay the transfer of the request until a later time. For instance, the DIN 104 may not be able to create or enter a manual request at the time the DIN 104 anticipates needing the ODC service. For example, the DIN 104 may have a hospital appointment (e.g., for surgery) and may not be able to make the request after the surgery (e.g., because the DIN 104 is incapacitated). As another example, the DIN 104 may anticipate not having cellular connectivity at the time of needing the ODC service. In such examples, the DIN 104 can create a request with a delay transmission constraint (e.g., entered via the interface 200 of FIG. 2). For example, the request may be set to activate at a particular time when the DIN 104 is done with surgery. The request is received by the request parser 144, but the request parser 144 delays transmitting the request to the available ODC(s) until the specified time. The request may also include other preset parameters such as automatically confirming any bids set below a set price amount, selecting the lowest bid received within a threshold period of time, selecting a bid based on the highest ODC review rating, selecting a bid based on closest proximity to the vehicle 106, etc.

Once the ODC service is agreed upon, the ODC 110 proceeds to the vehicle 106 during the scheduled time. In some examples, a map is displayed on the ODC device 112 to navigate the ODC 110 to the vehicle 106 (e.g., such as the map 602 in the interface 600 of FIG. 6). The map provides a suggested route to best guide the ODC 110 to the vehicle 106 to meet the timing criteria of the request. The location of the ODC 110 is tracked via the ODC device 112 and transmitted to the ODC system 102. In the illustrated example of FIG. 1, the ODC system 102 includes a navigation/location monitor 154 that monitors the location of the DIN device 108, the ODC device 112 and the vehicle 106. In some examples, the navigation/location monitor 154 creates maps and/or generates routes (e.g., the map 302 of FIG. 3, the map 402 of FIG. 4, the map 602 of FIG. 6, etc.), which are transmitted to the DIN device 108, the ODC device 112 and the vehicle 106. In the illustrated example, the ODC system 102 communicates with the vehicle 106 via a vehicle interface 156.

To enable the ODC 110 to unlock the doors of the vehicle 106 and start the vehicle 106, the ODC system 102 includes a softkey manager 158 that generates a softkey (e.g., a smart key) for the vehicle 106. The softkey is a digital key or certificate that, if matched correctly with the vehicle locking system (e.g., the BCM 120), unlocks the doors of the vehicle 106 and/or enables the vehicle 106 to be started. The softkey may be similar to, for example, a digital key used by a wireless key fob for the vehicle 106. In some examples, the softkey includes a proximity limitation (e.g., a distance) and/or a time limitation (e.g., an expiration time), as discussed in further herein. In some examples, the softkey manager 158 generates the softkey based on information or credentials about the vehicle 106 stored in the account database 142 (e.g., as associated with the account of the DIN 104). In other examples, the ODC system 102 interrogates the BCM 120 of the vehicle 106 to identify the necessary credentials for generating the softkey and/or obtains the credentials for generating the softkey from a protected network (e.g., a private network) operated by the manufacturer of the vehicle 106 (or another entity) that stores the softkey and/or associated credentials. In still other examples, the softkey manager 158 generates a unique lock that is transmitted (e.g., via the vehicle interface 156) to the vehicle 106 and a matching softkey, which is transmitted to the ODC device 112. In some examples, a plurality of one-time-use softkeys are generated for the vehicle 106. Once a softkey is used, it expires and cannot be used again to unlock the doors and/or start the vehicle 106. In some examples, a copy of the softkey is transmitted to the vehicle 106 so the vehicle 106 can track when a softkey is used and restrict the use of the same softkey again. In some such examples, the vehicle 106 can also verify the softkey is being used within the specified time period and, if not, can restrict access to the vehicle. In some examples, the softkey is transmitted from the softkey manager 258 to the vehicle 106, which is then transmitted from the vehicle 106 to the ODC device 112 (e.g., based on a time limitation and/or a proximity limitation). The communication from the vehicle 106 to the ODC device 112 may trigger the generation of an HMI (e.g., as illustrated in FIG. 6) for unlocking the doors of the vehicle 106. In some examples, other commands are sent directly from the vehicle 106 to the ODC device 112. In some examples, the softkey is communicated between the softkey manager 158, the DIN device 108, the ODC device 112 and/or the vehicle 106 via handshaking or another secured communication channel (e.g., Secured Socket Layer (SSL)).

In some examples, the DIN 104 authorizes the generation of the softkey. This generation may occur prior to any agreement of an ODC service, during the negotiation of the agreement, or after the agreement is reached. FIG. 5B illustrates an example interface 512 displayed on the DIN device 108 asking whether the DIN 104 wants to generate a softkey for the vehicle 106. The DIN 104 may select a create softkey button 514 and the softkey manager 158 (FIG. 1) generates the softkey. Otherwise, the DIN 104 may select a cancel button 516 to cancel the softkey generation. FIG. 5C illustrates an example interface 518 displayed on the DIN device 108 showing the progress of the softkey generation. FIG. 5D illustrates an example interface 520 displayed on the DIN device 108 indicating that the softkey has been generated (e.g., is active) and showing a countdown until expiration of the softkey.

As mentioned above, in some examples the softkey includes a proximity limitation, which requires the ODC 110 to be within a proximity or predefined distance or range of the vehicle 106 before sending the softkey. In some examples the proximity is defined by the DIN 104, e.g., during the request. In other examples, a default proximity (e.g., 50 feet) may be used. The navigation/location monitor 154 monitors the location of the ODC device 112, which is carried by the ODC 110. When the ODC device 112 is detected as being within the proximity of the vehicle 106, the softkey manager 158 transmits the softkey to the ODC device 112. Additionally or alternatively, in some examples the softkey includes an expiration time (e.g., a time limitation). For example, if the ODC 110 does not arrive at the vehicle 106 (e.g., within the proximity) within a predetermined period of time, the softkey expires and is not sent to the ODC device 112. In other words, if the expiration time as been exceeded before the softkey is transmitted, the softkey manager 158 does not transmit the softkey to the ODC device 112. In some examples, the softkey is automatically sent to the ODC device 112 after the agreement is reached. In some such examples, if the softkey is not used within a time limitation, the softkey expires and cannot be sent from the ODC device 112 to the vehicle 106, or the softkey can be sent but is denied by the vehicle 106.

Figure 7:
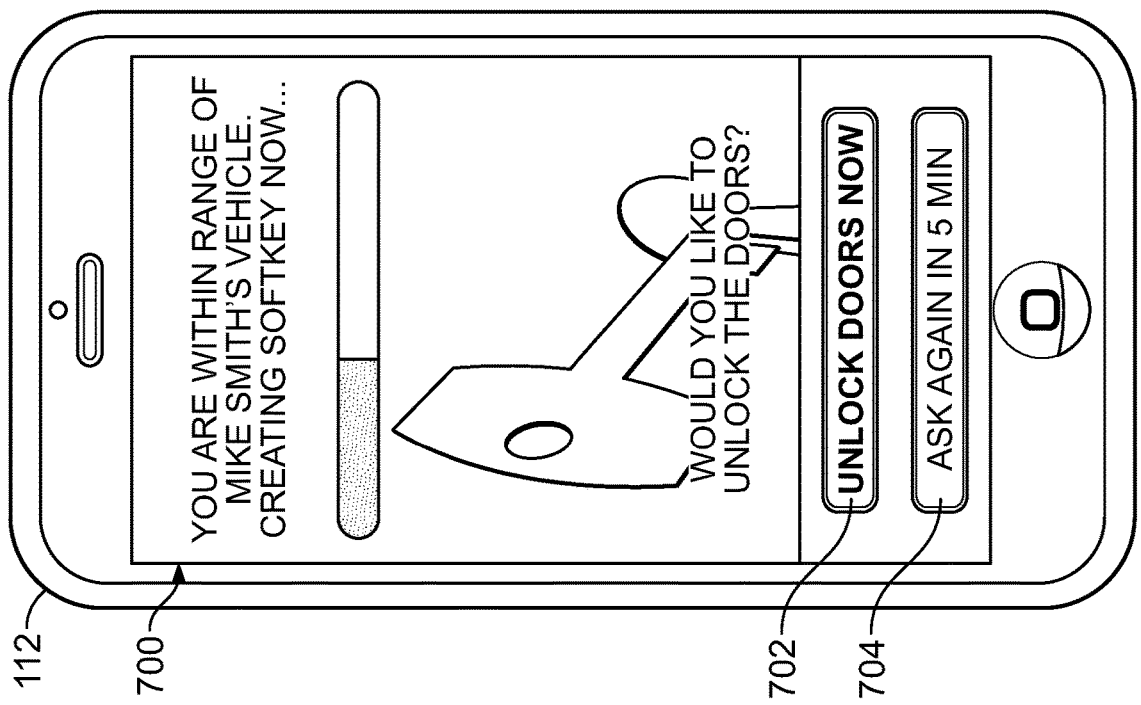
FIG. 7 illustrates an example interface displayed on an example ODC device for unlocking a vehicle associated with an ODC service from the example ODC system of FIG. 1.

Assuming the ODC 110 arrives at the vehicle 106 within the time limitation and/or within the proximity limitation, the softkey manager 158 transmits the softkey to the ODC device 112, which enables the ODC device 112 to unlock the doors of the vehicle 106. FIG. 7 illustrates an example interface 700 displayed on the ODC device 112. The interface 700 indicates that the ODC 110 is within the proximity limitation of the vehicle 106 and inquires whether the ODC 110 would like to unlock the doors of the vehicle 106. The ODC 110 can select an unlock button 702 (e.g., "Unlock Doors Now"), which causes the ODC device 112 to transmit the softkey to the vehicle 106 to unlock the doors. As disclosed herein, the ODC device 112 includes a wireless transceiver that communicates with the wireless transceiver 138 of the vehicle 106. The vehicle 106 receives the softkey (e.g., via the wireless transceiver 138) and the BCM 120 unlocks the doors of the vehicle 106 (e.g., if the softkey includes the correct credentials). Otherwise, the ODC 110 can select a delay button 704 (e.g., "Ask Again in 5 min") to delay transmission of the softkey. In some examples, instead of asking when to transmit the softkey, the ODC device 112 automatically transmits the softkey to the vehicle 106 to unlock the doors when the ODC device 112 receives the softkey. In some examples, the softkey also enables the ODC 110 to start the vehicle. In some examples, the ODC system 102 confirms the request criteria (e.g., as set by the DIN 104 during the request) prior to allowing the ODC 110 to start the vehicle 106. For example, if the DIN 104 is to be accompanying the vehicle 106, the ODC system 102 (e.g., via the navigation/location monitor 154) verifies the DIN 104 is in the vehicle 106. In other examples, the softkey manager 158 generates a separate softkey for allowing the ODC device 112 to start the vehicle 106.

In some examples, the softkey includes an instruction to restrict use (e.g., disable) of one or more features in the vehicle 106. For example, the softkey may disable the use of the radio, the climate settings, the Internet and/or any other feature the DIN 104 desires to restrict. As a result, the ODC 110 cannot activate or use the restricted feature(s) while driving the vehicle 106. Additionally or alternatively, the vehicle interface 156 may transmit an instruction to the vehicle 106 to restrict the use of one or more features. In some examples, the DIN 104 defines which feature(s) he/she desires to deactivate when creating the request criteria, for example.

In some examples, such as in the scenario where the DIN 104 is to accompany the vehicle 106, a dual softkey may be required to unlock the doors of the vehicle 106 and/or start the vehicle 106. The dual softkey requires a first softkey from the ODC device 112 and a second softkey from the DIN device 108. The first softkey and the second softkey are required to unlock and/or start the vehicle 106. In some examples, having a dual softkey enables the DIN 104 to make a final decision on whether to proceed with the ODC service after meeting the ODC 110 at the vehicle 106. For example, if the DIN 104 meets the ODC 110 at the vehicle 106 and feels uncomfortable about the ODC service (e.g., because the ODC 110 appears unfit to drive), the DIN 104 can decline the dual softkey, thereby preventing the ODC 110 from accessing the vehicle 106. In some examples, the option to implement a dual softkey is defined during the request by the DIN 104. Similar to the first softkey sent to the ODC device 112, a second softkey is generated and transmitted by the softkey manager 158 to the DIN device 108. In some examples, the second softkey includes a proximity and/or a time limitation. In other examples, the second softkey is automatically transmitted to the DIN device 108 after the agreement is reached. In still other examples, the second softkey may be previously stored or embedded in the DIN device 108. The DIN device 108 may display an interface, similar to the interface 700, that asks whether the DIN 104 wants to unlock the doors of the vehicle 106, at which time the second softkey is transmitted to the vehicle 106.

Once the ODC 110 (and/or the DIN 104) is in the vehicle 106 and the vehicle 106 has been started, the navigation/location monitor 154 determines a navigation route for the vehicle 106 and transmits the route to the ODC device 112 and/or the vehicle 106 to be displayed on the display 126 and/or the HUD 134. In some examples, the route is broadcast via the audio output 130. As such, the ODC 110 can abide by the suggested route for transferring the vehicle 106 to the vehicle drop-off location. As the ODC 110 drives the vehicle 106 to the vehicle drop-off location, the navigation/location monitor 154 tracks the location of the vehicle 106 (e.g., via the GNSS 136 in the vehicle 106 and/or GNSS in the ODC device 112). In some examples, the ODC system 102 transmits the location of the vehicle 106 to the DIN device 108 for display, such that the DIN 104 can monitor the location of the vehicle 106 throughout the ODC service.

In some examples, once the ODC 110 has started the vehicle 106, the vehicle interface 156 communicates with the vehicle 106 and determines whether the vehicle 106 has sufficient fuel or charge to reach the vehicle drop-off location. If the vehicle 106 does not have enough fuel or charge, the navigation/location monitor 154 determines an alternative route to guide the ODC 110 to a fuel or charge station. The selection of a fuel or charge station may be based on branch affiliation, price optimization, distance (e.g., the nearest fuel station), etc. The ODC 110 is then able to refuel or recharge the vehicle 106 and proceed to the vehicle drop-off location. Payment may be made by an application on the ODC device 112 or by the vehicle 106 (e.g., via the wireless transceiver 138), for example. In other examples, the ODC 110 may pay for the fuel/charge and be reimbursed at a later time.

In general, the ODC 110 is expected to the follow instructed route as provided by the navigation/location monitor 154. The navigation/location monitor 154 monitors the vehicle 106 while the vehicle 106 is driving to determine if the ODC 110 diverts from the instructed route (e.g., the navigation route). In some examples, the navigation/location monitor 154 tracks the location to determine if the vehicle 106 travels outside or beyond a corridor of the instructed route. The corridor is a predefined radius or distance in which the ODC 110 can depart from the instructed route. In some examples, the corridor is relatively strict and requires the ODC 110 to navigate a specific route without any departure. In other examples, the corridor may be wider, such that the ODC 110 can depart from the route by a predefined distance or radius (e.g., two blocks). In some examples, the corridor (e.g., the predefined radius) is defined by the DIN 104 (e.g., via the request criteria). In some examples, the DIN 104 may define the corridor based on a rating of the ODC 110. For example, an ODC with a high rating may be allowed a wider corridor than an ODC with a lower rating.

Figure 8:
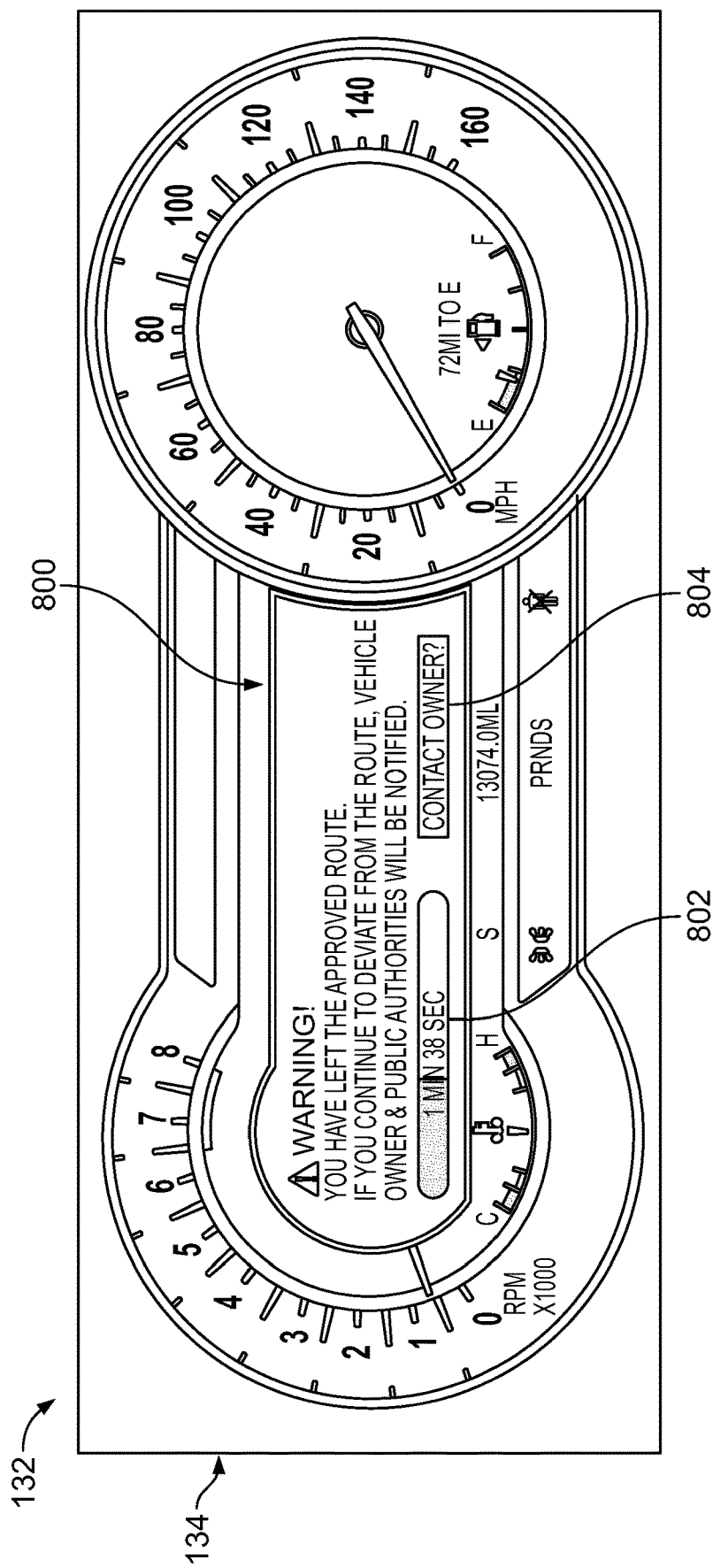
FIG. 8 illustrates an example warning displayed to an ODC via a vehicle instrument cluster when the ODC departs from an instructed route from the example ODC system of FIG. 1.

If the vehicle 106 is detected as traveling outside of the corridor of the route, an alerter 160 of the ODC system 102 transmits a warning or notice to the ODC device 112 and/or the vehicle 106. In other examples, the corridor of the route is downloaded to the vehicle 106 and the vehicle 106 automatically warns the ODC 110. The warning notifies the ODC 110 he/she has diverted from the intended route and instructs the ODC 110 to return to the route. FIG. 8 illustrates an example warning 800 displayed on the HUD 134 of the instrument cluster 132. In other examples, the warning 800 may be displayed on the display 126. In the illustrated example, the warning 800 includes a progress timer 802 and indicates that if the ODC 110 continues to deviate from the route, the DIN 104 and/or an authority (e.g., the local police) will be notified. If the vehicle 106 is not detected as being within corridor of the route within the time period, the alerter 160 transmits a notification to the DIN 104 and/or contacts the authorities. In some examples, the DIN 104 may specify, during the request process, whether or not the authorities should be notified in the event of a departure. In the illustrated example, the warning 800 includes a contact owner option 804, which enables the ODC 110 to contact the DIN 104 (e.g., via a phone associated with the vehicle 106 or the ODC device 112). The ODC 110 may contact the DIN 104 to explain why he/she has diverted from the route.

Figure 9:
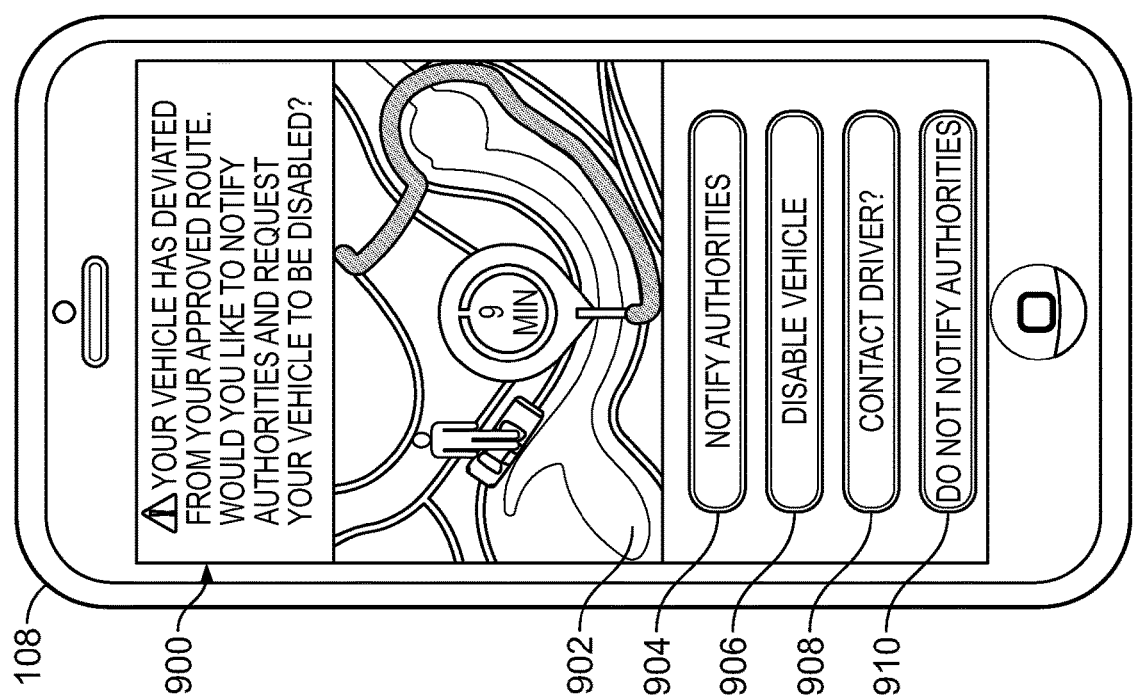
FIG. 9 illustrates an example interface displayed on an example DIN device, when the DIN is not in the vehicle, and an ODC has diverted from an instructed route from the example ODC system of FIG. 1.

If the ODC 110 is driving the vehicle 106 without the DIN 104, the ODC system 102 may notify the DIN 104 (via the DIN device 108) that the ODC 110 has strayed from the instructed route. FIG. 9 illustrates an example interface 900 displayed on the DIN device 108 to alert the DIN 104 that the vehicle 106 has diverted from the instructed route. In the illustrated example, the interface 900 includes a map 902 showing the current location of the vehicle 106 and the instructed route. The interface 900 provides the DIN 104 with a button 904 to contact the authorities (e.g., the police, the ODC system 102, etc.) and an option 906 to disable the vehicle. If the DIN 104 selects to notify the authorities, the alerter 160 contacts the authorities. If the DIN 104 selects to disable the vehicle, the vehicle interface 156 transmits an instruction to the vehicle 106 to turn of the engine, which may be implemented by the BCM 120 and the PCU 122. In the illustrated example, the interface 900 also provides the DIN with an option 908 to contact the ODC 110 (e.g., via a phone call or text), so that the DIN 104 can inquire about the reason for diverting from the route. In some situations, a departure from the instructed route may be justified, such as if there is heavy traffic, a road closure, an emergency, etc. The interface 900 includes an option 910 to not notify the authorities, such as if the departure is authorized or approved by the DIN 104. In some examples, if the DIN 104 does not respond to the interface 900 within a predetermined time period (e.g., 1 minute), the alerter 160 automatically contacts the authorities and/or disables the vehicle 106.

Figure 10:
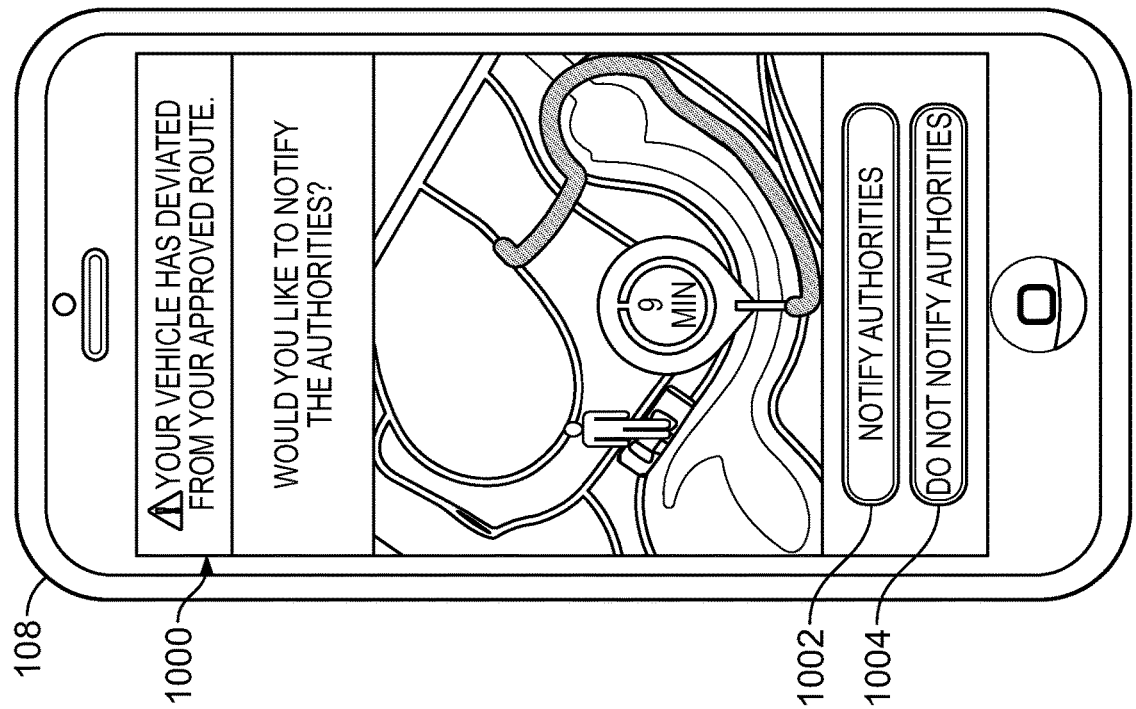
FIG. 10 illustrates an example interface displayed on an example DIN device, when the DIN is in the vehicle, and an ODC has diverted from an instructed route from the example ODC system of FIG. 1.

As mentioned above, in some scenarios the DIN 104 travels with the vehicle 106. If the vehicle 106 is detected as departing from the intended route, and the DIN 104 is in the vehicle 106, the ODC system 102 sends a message to the DIN 104 to inquire whether the DIN 104 is safe. FIG. 10 illustrates and example interface 1000 displayed on the DIN device 108. The interface 1000 alerts the DIN 104 that the vehicle has departed from the approved route and inquires whether or not the DIN 104 would like to notify the authorities. The interface 1000 includes an option 1002 to notify the authorities, similar to the button 904 in FIG. 9, and an option 1004 to not identify the authorities, similar to the option 910 of FIG. 9. In some examples, if the DIN 104 does not respond to the interface 1000 within a predetermined time period (e.g., 1 minute), the alerter 160 automatically contacts the authorities. In some examples, the DIN 104 may define a default setting for contacting or not contacting the authorities in the event the DIN 104 does not respond.

Otherwise, assuming the ODC 110 and the vehicle 106 arrive at the drop-off location, the ODC 110 turns off the engine and exits the vehicle 106. In some examples, once the vehicle 106 is detected as being at or near the vehicle drop-off location, the softkey expires and no longer allows reentry and/or restarting of to the vehicle 106. If the DIN 104 is not in the vehicle 106, the alerter 160 transmits a notification to the DIN device 108 to notify the DIN 104 that the vehicle 106 has been successfully delivered. After the ODC service is completed, the DIN 104 may leave a rating for the ODC 110, which may be saved to the account of the ODC 110 in the account database 142. In some examples, post-drive analytics recorded by the vehicle 106 are uploaded to the ODC system 102 for ranking/rating of the ODC experience. In some examples, information such as the adherence to the suggested route, obedience of laws and/or safe-driving practices are transmitted to the DIN device 108 so that the DIN 104 can choose to leave a tip for the ODC 110 (e.g., at the completion of the drive or at another time). Likewise, the ODC 110 may leave a rating for the DIN 104 (e.g., based on the condition of the vehicle, the experience with the DIN 104, etc.), which may be saved to the account of the DIN 104 in the account database 142.

The example ODC system 102 may also be used as a preemptive drunk driving mitigation tool. For example, an alcohol serving establishment could mandate (or offer for a discount on beverages) that the DIN 104 establishes a request for an ODC prior to engaging in drinking activities. The ODC system 102 could lockout the DIN 104 from driving the vehicle 106 based on a number of drinks the DIN 104 has consumed (e.g., as counted by the establishment) within a given time window. In some examples, once the DIN 104 pays or closes out his/her tab, the establishment could transmit the number of drinks to the ODC system 102 via a computer or other electronic device or could transmit the number of drinks via the DIN device 108. Additionally or alternatively, the DIN 104 may be required to perform a breathalyzer. If the DIN 104 is determined to have consumed too many drinks within the time window, the ODC system 102 automatically activates the request and facilities an ODC service for the DIN 104.

While example interfaces are illustrated in FIGS. 2-7, 9 and 10, it is understood that different interface(s) may be implemented to perform the examples disclosed herein. Additionally, more or less information and graphics may be provided on the interfaces and/or arranged differently. In the illustrated example of FIG. 1, the ODC system 102 is a server running a program that is in communication with the network 114. However, in other examples, the ODC system 102 is implemented by or incorporated into the DIN device 108 and/or the vehicle 106.

While an example manner of implementing the ODC system 102 is illustrated in FIG. 1, one or more of the elements, processes and/or devices illustrated in FIG. 1 may be combined, divided, re-arranged, omitted, eliminated and/or implemented in any other way. Further, the example account database 142, the example request parser 144, the example bid compiler 146, the example confirmation module 148, the example agreement database 150, the example payment processor 152, the example navigation/location monitor 154, the example vehicle interface 156, the example softkey manager 158, the example alerter 160 and/or, more generally, the example ODC system 102 of FIG. 1 may be implemented by hardware, software, firmware and/or any combination of hardware, software and/or firmware. Thus, for example, any of the example account database 142, the example request parser 144, the example bid compiler 146, the example confirmation module 148, the example agreement database 150, the example payment processor 152, the example navigation/location monitor 154, the example vehicle interface 156, the example softkey manager 158, the example alerter 160 and/or, more generally, the example ODC system 102 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example account database 142, the example request parser 144, the example bid compiler 146, the example confirmation module 148, the example agreement database 150, the example payment processor 152, the example navigation/location monitor 154, the example vehicle interface 156, the example softkey manager 158 and/or the example alerter 160 is/are hereby expressly defined to include a tangible computer readable storage device or storage disk such as a memory, a digital versatile disk (DVD), a compact disk (CD), a Blu-ray disk, etc. storing the software and/or firmware. Further still, the example ODC system 102 of FIG. 1 may include one or more elements, processes and/or devices in addition to, or instead of, those illustrated in FIG. 1, and/or may include more than one of any or all of the illustrated elements, processes and devices.

Flowcharts representative of example methods for implementing the ODC system 102 of FIG. 1 are shown in FIGS. 11-14. In these examples, the methods may be implemented by machine readable instructions that comprise a program for execution by a processor such as the processor 1512 shown in the example processor platform 1500 discussed below in connection with FIG. 15. The program may be embodied in software stored on a tangible computer readable storage medium such as a CD-ROM, a floppy disk, a hard drive, a digital versatile disk (DVD), a Blu-ray disk, or a memory associated with the processor 1512, but the entire program and/or parts thereof could alternatively be executed by a device other than the processor 1512 and/or embodied in firmware or dedicated hardware. Further, although the example methods are described with reference to the flowcharts illustrated in FIGS. 11-14, many other methods of implementing the example system 102 may alternatively be used. For example, the order of execution of the blocks may be changed, and/or some of the blocks described may be changed, eliminated, or combined.

As mentioned above, the example methods of FIGS. 11-14 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 11-14 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 11:
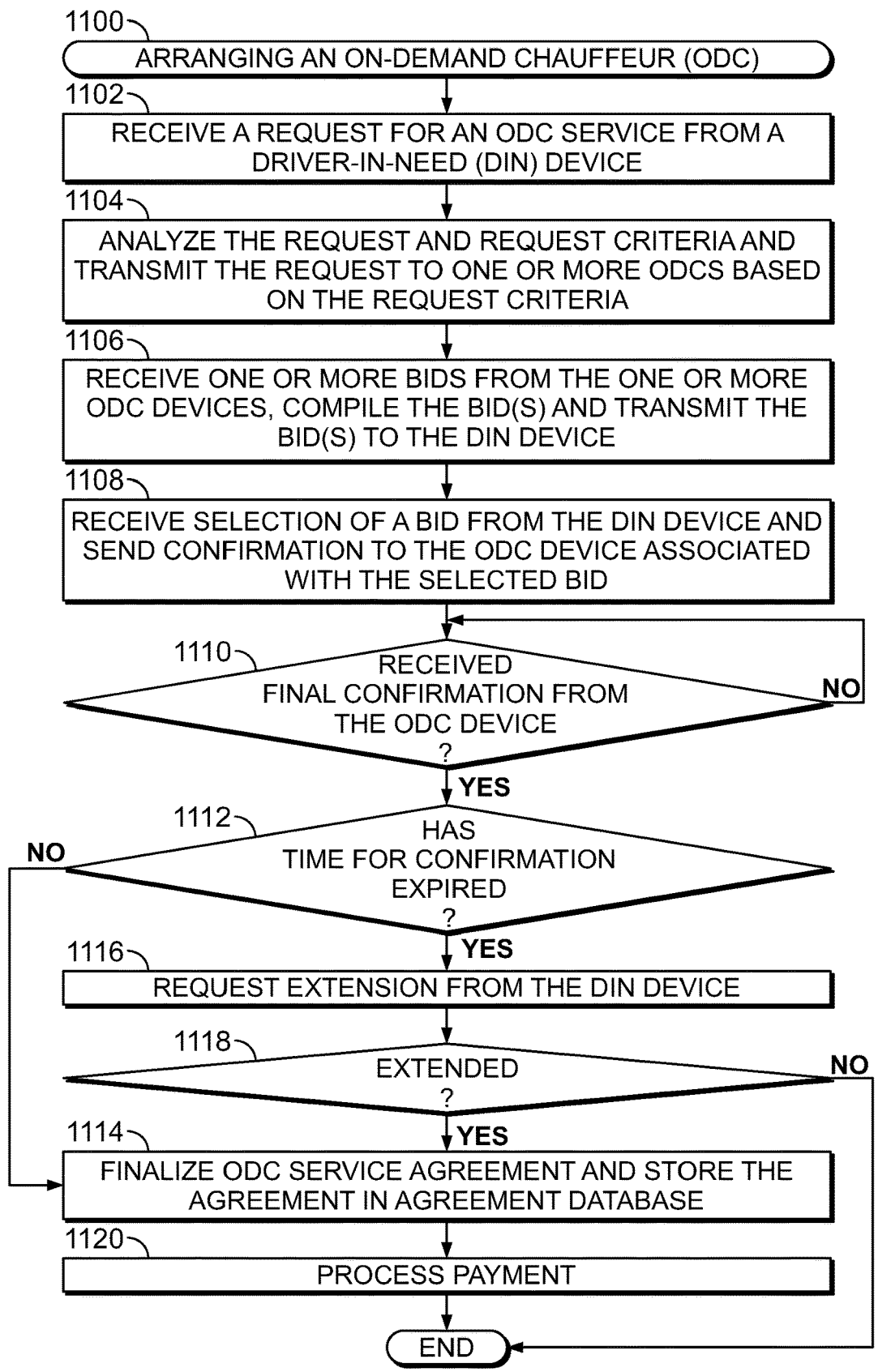
FIG. 11 is a flowchart illustrating an example method that may be implemented by the example ODC system of FIG. 1 for arranging an ODC service.

FIG. 11 is a flowchart illustrating an example method 1100 implemented by the example ODC system 102 of FIG. 1 to arrange an ODC service between a DIN and an ODC. For purposes of discussion, the example method 1100 is described in connection with an ODC service between the DIN 104 and the ODC 110 of FIG. 1. At block 1102, the ODC system 102 receives a request from the DIN 104 for an ODC service. The request includes one or more criteria or parameters. In some examples, the request criteria includes identification of the vehicle pick-up location and drop-off location, any time constraints (e.g., within the next 20 minutes) and whether the DIN 104 will be present during the ODC service. In some examples, other criteria or parameters may be provided, such as a request duration period, identifiable characteristics of the vehicle, an ODC gender preference, an ODC minimum review rating, a flexible time scheduling mode, a reserve maximum price limit and/or a geo-fence proximity to the vehicle 106. The request may be created via the interface 200 as illustrated in FIG. 2, for example.

At block 1104, the request parser 144 of the ODC system 102 analyzes the request and the request criteria and transmits the request to one or more ODC devices based on the request criteria. For example, the request parser 144 may only send the request to ODC devices detected as being within a predefined radius of the vehicle pick-up location and are capable of completing the ODC service within the specific time parameters. Other criteria, such as an ODC gender preference, an ODC rating, etc. may also be used to select qualified ODCs for the requested ODC service. The potential ODCs may receive and review the request. If an ODC, such as the ODC 110, desires to perform the ODC service, the ODC 110 enters a bid and submits the bid to the ODC system 102. The ODC 110 may use the interface 300 of FIG. 3 to accept a request and the example interface 400 of FIG. 4 to enter and submit the bid, for example.

At block 1106, the bid compiler 146 receives and analyzes the bid(s) from the one or more ODCs. The bid compiler 146 compiles the bids and transmits the bids along with certain information to the DIN device 108. The additional information may include the ODC's distance to the vehicle, a picture of the ODC, the ODC rating, etc. The information relating to the ODC 110 is stored in the account database 142. The DIN 104 reviews the bid(s) on the DIN device 108 and selects one of the ODCs. The interface 500 (FIG. 5A) is an example interface showing multiple bids from which the DIN 104 may select. The DIN 104 selects one of the bids and the selection is sent to the ODC system 102. At block 1108, the confirmation module 148 receives the bid selection from the DIN device 108 and sends a final confirmation to ODC device 112, which is the device associated with the selected bid.

At block 1110, the confirmation module 148 waits to receive final confirmation from the ODC device 112. If the confirmation module 148 receives final confirmation from the ODC device 112, the confirmation module 148 determines whether the request has expired (block 1112). As mentioned above, in some examples the request may include an expiration time limit and, if both parties have not agreed on the ODC service within the expiration time limit, the request expires. If the request has not yet expired, the confirmation module 148 finalizes the ODC service agreement (between the DIN 104 and ODC 110) and stores the agreement in the agreement database, at block 1114.

If the request has expired, at block 1116 the confirmation module 148 requests an extension from the DIN device 108. At block 1118, the confirmation module 148 determines whether the DIN 104 approves the extension. If the request is extended, the ODC service agreement is finalized and stored in the agreement database 150, at block 1114. Otherwise, if the DIN 104 does not approve the extension, the example method 1100 ends. After the agreement is finalized, at block 1120 the payment processor 152 completes the transaction and transfer funds from the DIN 104 to the ODC 110 (e.g., via a credit card transaction). In other examples, payment is not transferred until after completion of the ODC service (e.g., once the vehicle 106 is delivered to the vehicle drop-off location).

Figure 12:
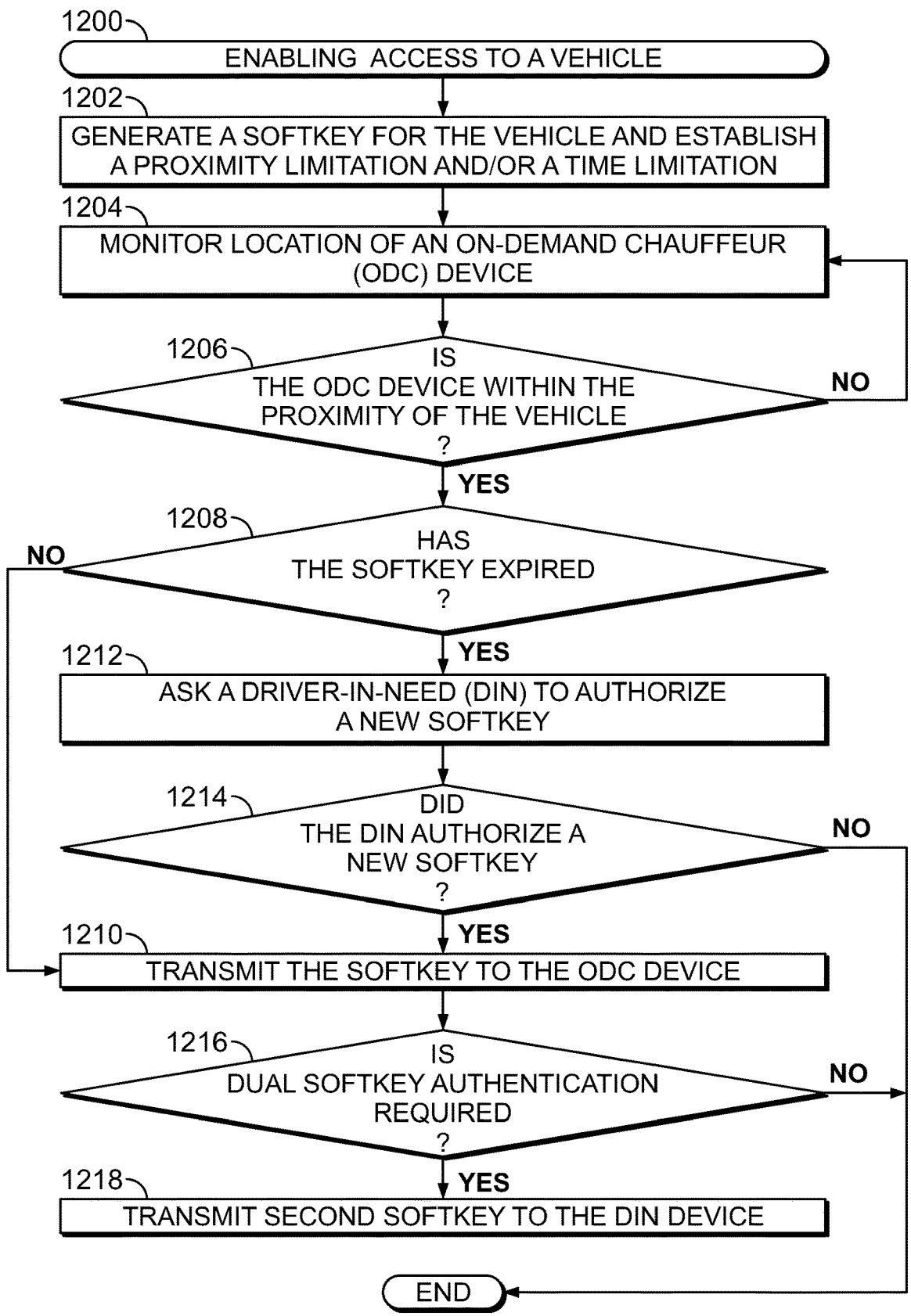
FIG. 12 is a flowchart illustrating an example method that may be implemented by the example ODC system of FIG. 1 for enabling an ODC to access and start a vehicle.

FIG. 12 is a flowchart illustrating an example method 1200 implemented the example ODC system 102 of FIG. 1 to enable access to a vehicle in accordance with an ODC service agreement. The example method 1200 may be performed after an ODC agreement has been finalized such as, for example, as disclosed in FIG. 11. For purposes of discussion, it is assumed that the DIN 104 and the ODC 110 have agreed upon an ODC service. At block 1202, the softkey manager 158 of the example ODC system 102 generates a softkey for the vehicle 106, which is associated with the agreement. In some examples, a proximity limitation (e.g., a distance or range) and/or a time limitation are established for the softkey. In some examples, the proximity and/or time limitation may be defined by the DIN 104. For example, the DIN 104 may enter or specify the proximity and/or time limitations during the request, such as on the interface 200 in FIG. 2. In other examples, a default proximity and/or time limitation may be implemented.

At block 1204, the navigation/location monitor 154 monitors the location of the ODC device 112 as the ODC 110 travels to the vehicle 106 during the agreed upon time. At block 1206, the navigation/location monitor 154 determines whether the ODC device 112 is within the proximity of the vehicle 106 based on the location of the ODC device 112 and the location of the vehicle 106. If the ODC device 112 is not within the proximity, the navigation/location monitor 154 continues to track the location of the ODC device 112. If the ODC device 112 is within the proximity of the vehicle 106, the softkey manager 158 determines whether the softkey has expired based on the time limitation (block 1208). If the softkey has not expired, the softkey manager 158 transmits the softkey to the ODC device 112 (block 1210). Once the ODC device 112 receives the softkey, the ODC 110 may unlock the vehicle 106.

If the softkey has expired, at block 1212 the softkey manager 158 transmits a message to the DIN device 108 to ask for authorization to generate a new softkey or extend the expiration period of the softkey. At block 1214, the softkey manager 158 determines whether the DIN 104 authorized a new softkey and/or extended the initial softkey. If the DIN 104 authorizes the new softkey and/or extends the initial softkey, the softkey manager 158 transmits the softkey to the ODC device 112 at block 1210. Otherwise, the example method 1200 ends.

In some examples, a dual softkey is required to unlock the vehicle 106. A dual softkey may be employed when the DIN 104 is to accompany the vehicle 106 during the ODC service. At block 1216 the softkey manager 158 determines if a dual softkey authentication is required. In some examples, the dual softkey requirement is set by the DIN 104 during the request process and is stored with the agreement in the agreement database 150. If a dual softkey is required, the softkey manager 158 transmits a second softkey to the DIN device 108. The DIN 104 receives the second softkey and may decide whether or not to transmit the second softkey to the vehicle 106 to unlock the doors. In some examples, the second softkey is automatically transmitted to the DIN device 108 after the agreement. In some examples, the second softkey may already be stored on the DIN device 108, and the DIN 104 may select when to transmit the second softkey.

Figure 13:
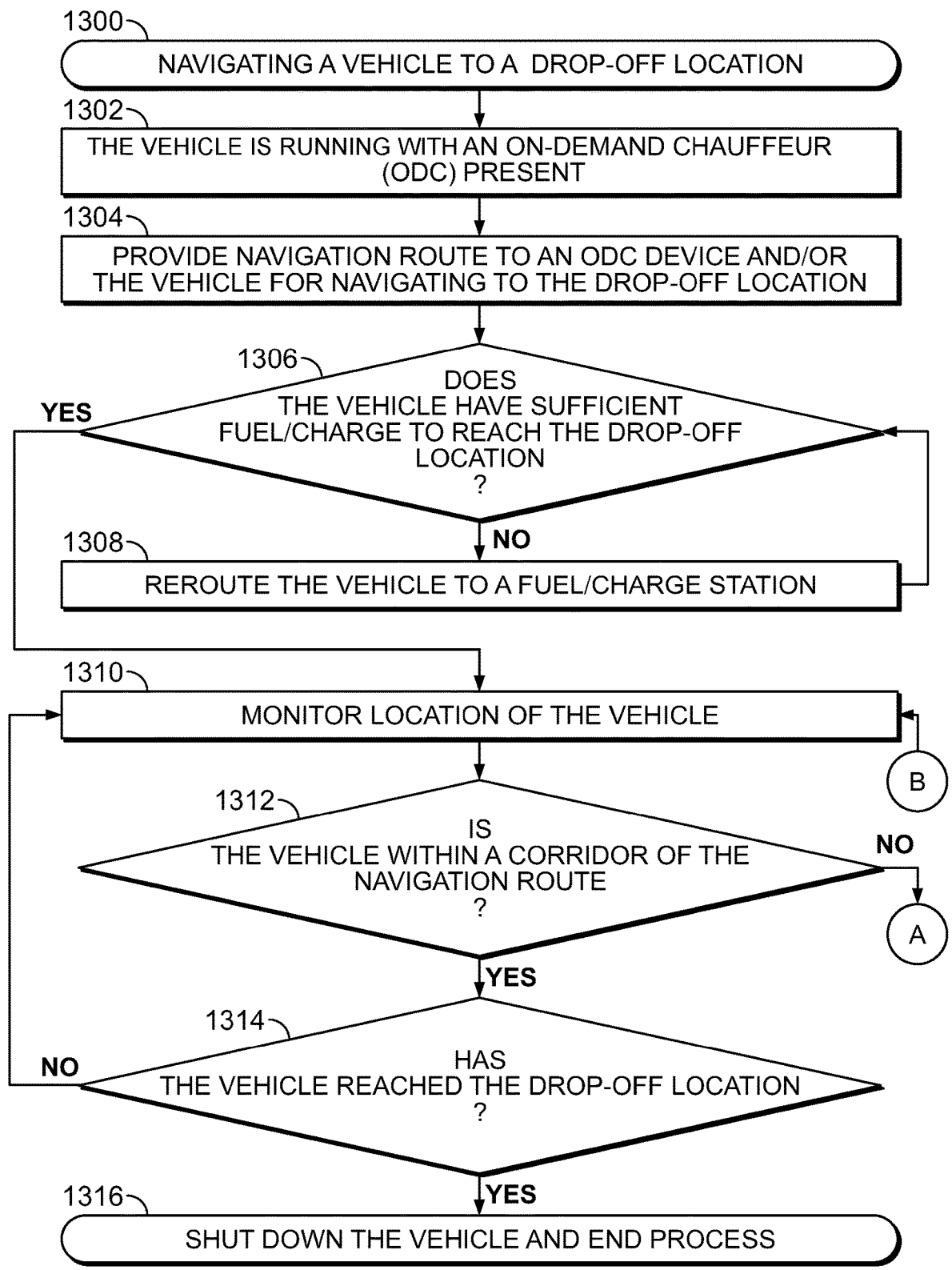
FIG. 13 is a flowchart illustrating an example method that may be implemented by the example ODC system of FIG. 1 for monitoring an ODC while transferring a vehicle from a vehicle pick-up location to a vehicle drop-off location.

FIG. 13 is a flowchart illustrating an example method 1300 implemented by the example ODC system 102 of FIG. 1 to monitor a location of a vehicle during an ODC service. The example method 1300 may be implemented after an agreement is confirmed for an ODC service (e.g., as illustrated in FIG. 11) and after the ODC 110 has entered the vehicle (e.g., as illustrated in FIG. 12). At block 1302, the vehicle interface 156 of the ODC system 102 confirms that the vehicle 106 is running with the ODC present. At block 1304, the navigation/location monitor 154 transmits a navigation route to the ODC device 112 and/or to the vehicle 106 for navigating the vehicle 106 to the vehicle drop-off location. The navigation route may be displayed on the ODC device 112. Additionally or alternatively, the navigation route may be displayed on the display 126 and/or the HUD 134 of the vehicle 106. At block 1306, the vehicle interface 156 determines how much fuel/charge the vehicle 106 has and the navigation/location monitor 154 determines whether the vehicle 106 has sufficient fuel or charge to reach the vehicle drop-off location. If the vehicle 106 does not have enough fuel or charge, the navigation/location monitor 154 reroutes the vehicle 106 to a gas or charge station (block 1308). A gas or charge station may be selected based on branch affiliation, distance to the nearest fuel/charge station, etc. In some examples, the ODC 110 pays for the fuel/charge via an application on the ODC device 112. After refueling, the navigation/location monitor 154 continues to provide a navigation route to the drop-off location.

At block 1310, the navigation/location monitor 154 monitors the location of the vehicle 106. The location of the vehicle 106 may be determined based on the GNSS 136 in the vehicle 106 and/or the location of the ODC device 112 (which is assumed to be in the vehicle 106 with the ODC 110). In some examples, the location of the vehicle 106 is transmitted to the DIN device 108 so that the DIN 104 can monitor the location of the vehicle 106 on the DIN device 108. At block 1312, the navigation/location monitor 154 determines whether the vehicle 106 is within a corridor (e.g., an allowable range) of the instructed route. In some examples, the corridor is set relatively narrow, such that the navigation/location monitor 154 requires the vehicle 106 to adhere to a particular path. In other examples, the corridor is set relatively wide or loose, such that the vehicle 106 can divert from the instructed route a predefined radius (e.g., two blocks). If the navigation/location monitor 154 determines that the vehicle 106 has diverted from the corridor of the route, the example method 1300 proceeds through A to block 1402 in FIG. 14 (described in further detail herein) to alert the ODC 110, the DIN 104 and/or the authorities of the departure.

If the vehicle 106 is within the corridor of the route, the navigation/location monitor 154 determines whether the vehicle 106 has reached the vehicle drop-off location (block 1314), based on the location of the vehicle 106. If the vehicle 106 is not at the drop-off location, the navigation/location monitor 154 continues to monitor the location of the vehicle 106 (block 1310) and determine whether the vehicle 106 is within the corridor of the route (block 1312). Once the vehicle 106 has reached the drop-off location, the vehicle interface 156 confirms that the vehicle 106 has been shut down and the agreement is completed (block 1316). In some examples, as mentioned above, payment is processed by the payment processor 152 after completing of the vehicle transfer.

Figure 14:
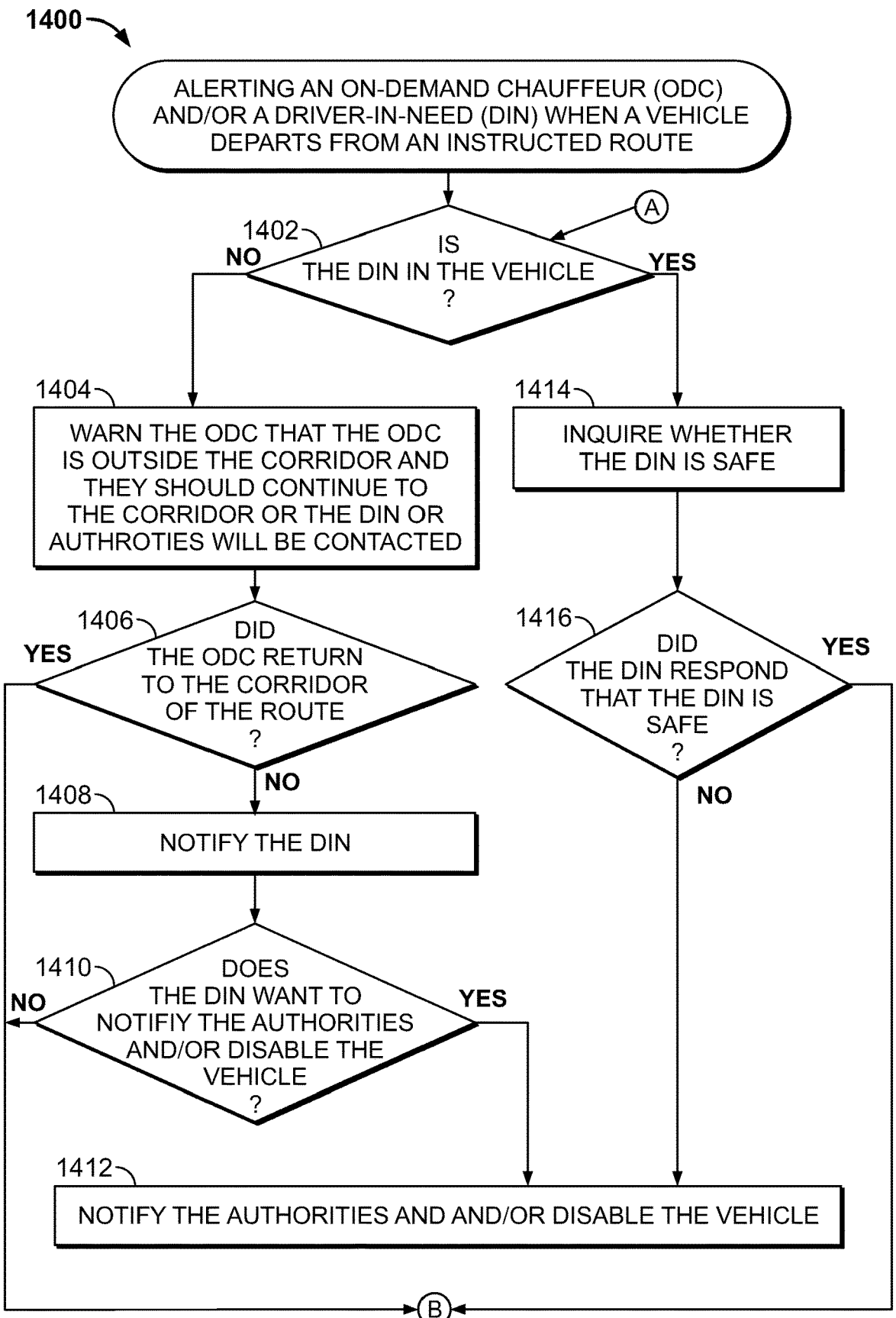
FIG. 14 is a flowchart illustrating an example method that may be implemented by the example ODC system of FIG. 1 when an ODC deviates from an instructed route during an ODC service.

FIG. 14 is a flowchart illustrating an example method 1400 implemented by the example ODC system 102 of FIG. 1 to alert the ODC 110 and/or DIN 104 when the vehicle diverts from the corridor of the route (e.g., as determined at block 1312 of FIG. 13). At block 1402, the alerter 160 determines whether or not the DIN 104 is with the vehicle 106 (i.e., accompanying the vehicle 106 and the ODC 110). In some examples, the alerter 160 confirms whether or not the DIN 104 is in the vehicle 106 based on the criteria in the agreement (e.g., stored in the agreement database 150). Additionally or alternatively, the alerter 160 may determine whether the DIN 104 is in the vehicle 106 based on the location of the DIN device 108 (e.g., from the GNSS of the DIN device 108). If the DIN 104 is not in the vehicle 106, the alerter 160 transmits an alert (e.g., a warning message) to the ODC device 112 and/or the vehicle 106 to warn the ODC 110 that the ODC 110 has left the approved corridor (block 1404). For example, as illustrated in FIG. 8, the example warning 800 indicates the ODC 110 has left the approved route. In some examples, an alert timer is started (e.g., the progress timer 802 of FIG. 8), which gives the ODC 110 a predefined amount of time to return to the corridor of the route. In some examples, the ODC 110 is given the option (e.g., the option 804 of FIG. 8) to contact the DIN 104 (e.g., via a phone call or text). The ODC 110 may contact the DIN 104 to explain why he/she has diverted from the instructed route and may seek authorization for the departure. At block 1406, the navigation/location monitor 154 determines whether the vehicle 106 returned to the corridor of the route. If the vehicle 106 returns to the instructed route prior the expiration of the alert timer, the example method 1400 follows B to block 1310 of FIG. 13 where the navigation/location monitor 154 continues to monitor the location of the vehicle 106 (block 1310) and determine whether the vehicle 106 is within the corridor (block 1312).

Otherwise, if the vehicle does not return to the instructed route, at block 1408 the alerter 160 transmits an alert to the DIN device 108. An example alert is illustrated in the example interface 900 of FIG. 9. In some examples, the alert inquires whether the DIN 104 desires to approve the departure or notify the authorities and/or disable the vehicle. At block 1410, the alerter 160 determines whether the DIN 104 wants to disable the vehicle 106 and/or notify the authorities. If the DIN 104 elects to approve the departure, the example method 1400 follows B to block 1310 of FIG. 13 where the navigation/location monitor 154 continues to monitor the location of the vehicle 106 (block 1310) and determine whether the vehicle 106 is within the corridor (block 1312). Otherwise, at block 1412 the alerter 160 contacts the authorities. Additionally or alternative, the vehicle interface 156 sends an instruction to the vehicle 106 to turn off the engine (e.g., via the PCU 122 of FIG. 1) based on input from the DIN device 108.

Referring back to block 1402, if the alerter 160 determines the DIN is in the vehicle 106, the alerter 160 sends an alert to the DIN device 108 to inquire whether the DIN 104 is safe (block 1414). An example alert is illustrated in FIG. 10. At block 1416, the alerter 160 determines whether the DIN 104 responded. If the DIN 104 responds that he/she is safe, the navigation/location monitor 154, the example method 1400 follows B to block 1310 of FIG. 13 where the navigation/location monitor 154 continues to monitor the location of the vehicle 106 (block 1310) and determine whether the vehicle 106 is within the corridor (block 1312). If the DIN 104 responds that he/she is not safe or if the DIN 104 does not respond within a predetermined period of time, the alerter 160 contacts or notifies the authorities and/or the vehicle interface 156 sends an instruction to the vehicle 106 to shut down (block 1412). In some examples, default instructions may be set by the DIN 104 in the event the DIN 104 does not respond within the predetermined period of time.

Figure 15:
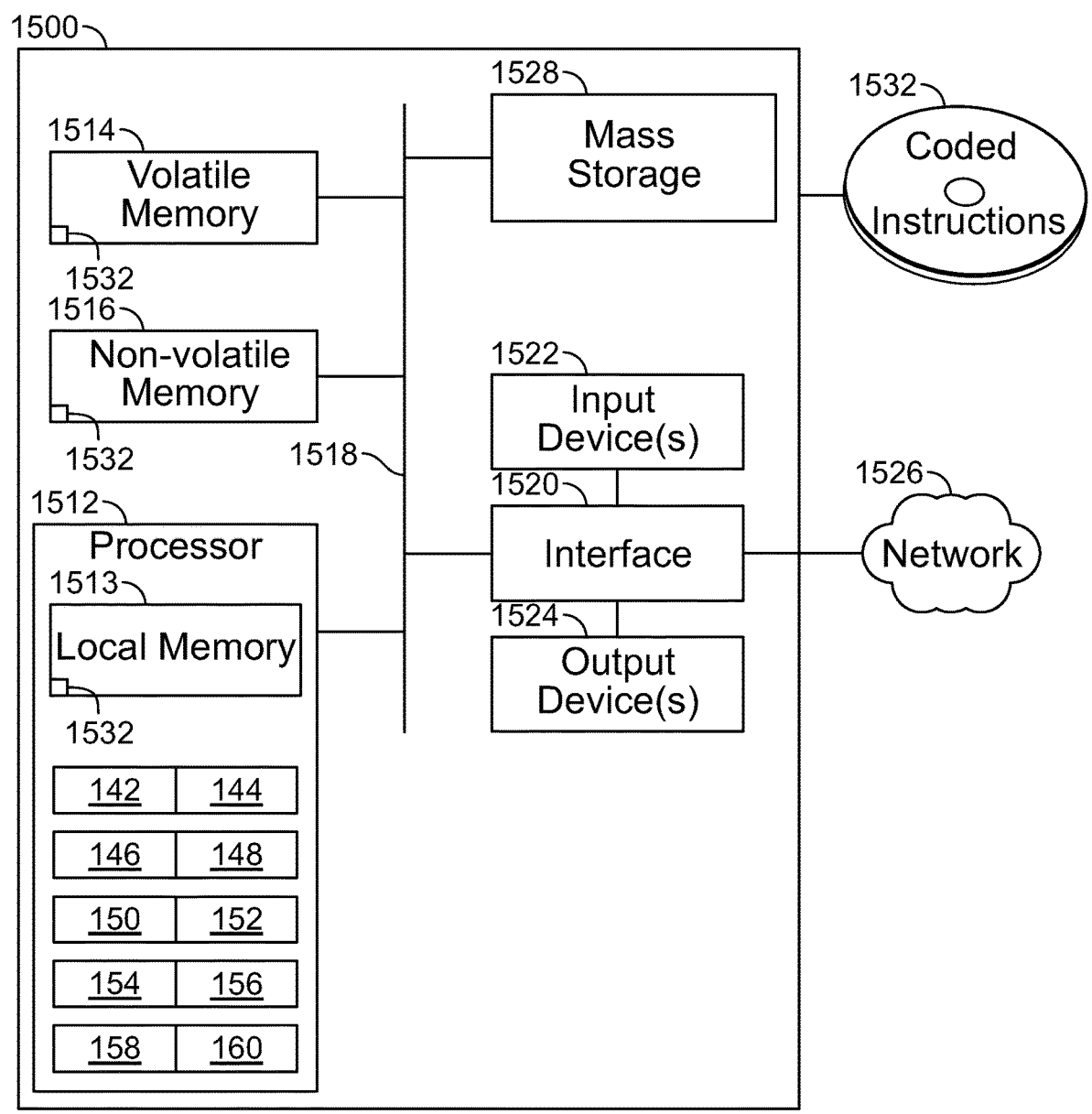
FIG. 15 is a block diagram of an example processor system structured to execute example machine readable instructions represented at least in part by FIGS. 11-14 to implement the example ODC system of FIG. 1.

FIG. 15 is a block diagram of an example processor platform 1500 capable of executing instructions to implement the methods 1100, 1200, 1300, 1400 of FIGS. 11-14 and the ODC system 102 of FIG. 1. The processor platform 1500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1500 of the illustrated example includes a processor 1512. The processor 1512 of the illustrated example includes hardware that may implement one or more of the example account database 142, the example request parser 144, the example bid compiler 146, the example confirmation module 148, the example agreement database 150, the example payment processor 152, the example navigation/location monitor 154, the example vehicle interface 156, the example softkey manager 158 and/or the example alerter 160 of the ODC system 102 of FIG. 1. For example, the processor 1512 can be implemented by one or more integrated circuits, logic circuits, microprocessors or controllers from any desired family or manufacturer.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.).

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives.

Coded instructions 1532 to implement the methods 1100, 1200, 1300, 1400 of FIGS. 11-14 may be stored in the mass storage device 1528, in the volatile memory 1514, in the non-volatile memory 1516, and/or on a removable tangible computer readable storage medium such as a CD or DVD.

From the foregoing, it will be appreciated that the above disclosed methods, systems/apparatus and articles of manufacture facilitate the scheduling and execution of an ODC service between a DIN and an ODC. The example ODC systems disclosed herein enable a DIN to easily and confidently schedule an ODC service to have his/her vehicle transferred, with or without the DIN, from one location to another. As a result, the example ODC systems decrease the chance the DIN would otherwise be required to drive his/her car when they are incapable of driving (e.g., inebriated).

Further, example ODC systems disclosed herein utilize softkeys to grant the ODC to access and start the vehicle, thereby eliminating the need to have access to the physical key for the vehicle. Thus, an ODC can unlock and start a vehicle without the DIN being present. Example softkeys can also be used to restrict access to certain features in the vehicle (e.g., the radio, the climate settings, etc.). Further, the example ODC systems monitor and track the vehicle during the ODC service and provide numerous checks to ensure the ODC performs the ODC service according the agreement.

Although certain example methods, systems/apparatus and articles of manufacture have been disclosed herein, the scope of coverage of this patent is not limited thereto. On the contrary, this patent covers all methods, systems/apparatus and articles of manufacture fairly falling within the scope of the claims of this patent.

What is claimed is:

1. A system comprising:
   at least one memory;
   instructions in the system; and
   processor circuitry to execute the instructions to:
   generate a first softkey and a second softkey for a vehicle associated with an agreement between a driver-in-need (DIN) and an on-demand driver (ODD), the first softkey and the second softkey required to unlock the vehicle;

transmit the first softkey to an ODD device carried by the ODD such that the first softkey can be transmitted from the ODD device to the vehicle for unlocking the vehicle in combination with the second softkey; and transmit the second softkey to a DIN device carried by the DIN such that the second softkey can be transmitted from the DIN device to the vehicle for unlocking the vehicle in combination with the first softkey.

2. The system of claim 1, wherein the instructions, when executed, cause the processor circuitry to:

track a location of the ODD device; and transmit the first softkey to the ODD device when the ODD device is detected as being within a proximity of the vehicle.

3. The system of claim 2, wherein the instructions, when executed, cause the processor circuitry to track the location of the ODD device based on Global Positioning System (GPS) coordinates from the ODD device.

4. The system of claim 1, wherein the first softkey and the second softkey are required to start the vehicle.

5. The system of claim 1, further including a database to store credentials associated with the vehicle, and wherein the instructions, when executed, cause the processor circuitry to generate the first softkey based on the credentials.

6. The system of claim 1, wherein the instructions, when executed, cause the processor circuitry to:

interrogate the vehicle to identify credentials associated with the vehicle; and generate the first softkey based on the credentials.

7. The system of claim 1, wherein the instructions, when executed, cause the processor circuitry to:

obtain credentials associated with the vehicle from a private network operated by a manufacturer of the vehicle; and generate the first softkey based on the credentials.

8. The system of claim 1, wherein the instructions, when executed, cause the processor circuitry to generate the first and second softkeys in response to a request from the DIN device.

9. The system of claim 1, wherein the first softkey includes an instruction to disable a feature in the vehicle.

10. A method comprising:

generating, with an on-demand driver (ODD) system, a first softkey and a second softkey for a vehicle associated with an agreement between a driver-in-need (DIN) and an ODD, the first softkey and the second softkey required to unlock the vehicle;

transmitting, with the ODD system, the first softkey to an ODD device carried by the ODD such that the first softkey can be transmitted from the ODD device to the vehicle to enable the first softkey, in combination with the second softkey, to unlock the vehicle; and transmitting, with the ODD system, the second softkey to a DIN device carried by the DIN such that the second softkey can be transmitted from the DIN device to the vehicle to enable the second softkey, in combination with the first softkey, to unlock the vehicle.

11. The method of claim 10, wherein transmitting the first softkey to the ODD device includes:

monitoring, with the ODD system, a location of the ODD device; and transmitting, with the ODD system, the first softkey to the ODD device when the ODD device is within a proximity of the vehicle.

12. The method of claim 10, further including, prior it to generating the first and second softkeys, creating and storing, with the ODD system, a record of the agreement between the DIN and the ODD in which the ODD is to drive the vehicle from a first location to a second location with the DIN as a passenger in the vehicle.

13. The method of claim 12, wherein the agreement includes an agreed upon price for driving the vehicle from the first location to the second location.

14. The method of claim 10, further including:

determining, with the ODD system, a navigation route for the vehicle;

tracking, with the ODD system, a location of the vehicle; and determining, with the ODD system, whether the vehicle diverts from the navigation route based on the location of the vehicle.

15. The method of claim 14, further including:

transmitting, with the ODD system, an alert to the DIN device if the vehicle diverts from the navigation route; and notifying, with the ODD system, an authority if the DIN does not respond within a period of time.

16. A system comprising:

at least one memory;

instructions in the system; and processor circuitry to execute the instructions to:

generate a first softkey and a second softkey associated with a vehicle, the vehicle associated with an agreement between a driver-in-need (DIN) and an on-demand driver (ODD);

transmit the first softkey to an ODD device carried by the ODD; and transmit the second softkey to the vehicle, such that when the first softkey is transmitted from the ODD device to the vehicle, the first softkey matches the second softkey and enables the ODD device to unlock the vehicle.

17. The system of claim 16, wherein the first softkey is a one-time-use softkey.

18. The system of claim 16, wherein the first softkey is used to start the vehicle.

19. The system of claim 16, wherein the first softkey includes an instruction to disable a feature in the vehicle.

20. The system of claim 16, wherein the first softkey includes an expiration time, and, if the expiration time has been exceeded before the first softkey is transmitted, the processor circuitry does not transmit the first softkey to the ODD device.

* * * * *